US008139788B2

(12) United States Patent
Hiroe et al.

(10) Patent No.: US 8,139,788 B2

(45) Date of Patent: Mar. 20, 2012

(54) APPARATUS AND METHOD FOR SEPARATING AUDIO SIGNALS

(75) Inventors: Atsuo Hiroe, Kanagawa (JP); Keiichi Yamada, Tokyo (JP); Helmut Lucke, Hildesheim (DE)

(73) Assignee: Sony Corporation, Tokyo (JP)

( * ) Notice: Subject to any disclaimer, the term of this patent is extended or adjusted under 35 U.S.C. 154(b) by 1331 days.

(21) Appl. No.: 11/338,267

(22) Filed: Jan. 24, 2006

(65) Prior Publication Data

US 2006/0206315 A1 Sep. 14, 2006

(30) Foreign Application Priority Data

Jan. 26, 2005 (JP) ................................ 2005-018822
Sep. 15, 2005 (JP) ................................ 2005-269128

(51) Int. Cl.
*H04B 15/00* (2006.01)

(52) U.S. Cl. ..................... 381/94.7; 381/71.1; 381/94.2; 704/200; 704/233

(58) Field of Classification Search .................. 704/233, 704/10, 270, 222–223, 217, 219, 246, 264, 704/242, 228, 226, 203, 205, 208, 200, 255, 704/236, 240, 250, 20; 381/94.2, 71.1–71.14, 381/94.7

See application file for complete search history.

(56) References Cited

U.S. PATENT DOCUMENTS 5,706,402 A * 1/1998 Bell ................................ 706/22
5,959,966 A * 9/1999 Torkkola ........................ 370/203
6,185,309 B1 * 2/2001 Attias .......................... 381/94.1
7,315,816 B2 * 1/2008 Gotanda et al. ............... 704/226

OTHER PUBLICATIONS

Hiroshi Saruwatari, Toshiya Kawamura, and Kiyohiro Shikano Fast-Convergence Algorithm for ICA-Based Blind Source Separation Using Array Signal Processing Oct. 21-24, 2001, IEEE Workshop on Application of Signal Processing to Audio and Acoustics 2001.*

Mitianoudis et al, "Audio Source Separation of Convolutive Mixtures", IEEE Transactions on Speech and Audio Processing, vol. 11, No. 5, Sep. 2003.*

Saruwatari et al "Fast-Convergence Algorithm for ICA-Based Blind Source Separation Using Array Signal Processing", IEEE Workshop on Applications of Signal Processing to Audio and Acoustics, Oct. 21-24, 2001, p. 91-94.*

Zibulevsky et al "Blind Source Separation by Sparse Decomposition", Nov. 21, 2001, pp. 1-22, University of New Mexico.*

* cited by examiner

*Primary Examiner* — Vivian Chin
*Assistant Examiner* — Leshui Zhang
(74) *Attorney, Agent, or Firm* — Frommer Lawrence & Haug LLP; William S. Frommer; Thomas F. Presson

(57) ABSTRACT

An audio signal separation apparatus for separating observation signals in the time domain of a mixture of a plurality of signals including audio signals into individual signals by means of independent component analysis to produce isolated signals adapted to produce isolated signals in the time-frequency domain from the observation signals in the time-frequency domain and a separation matrix substituted by initial values, compute the modified value of the separation matrix by using a score function using the isolated signals in the time-frequency domain and a multidimensional probability density function and the separation matrix, modify the separation matrix until the separation matrix substantially converges by using the modified value and produce isolated signals in the time-frequency domain by using the substantially converging separation matrix.

5 Claims, 22 Drawing Sheets

Case 1 (without permutation)

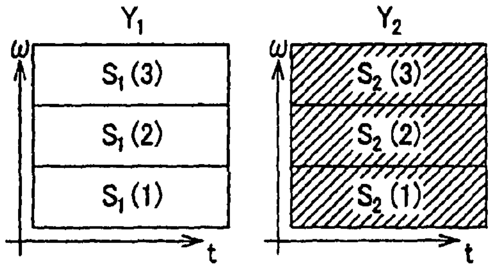

Prior art $$I(\mathbf{Y}(3)) = E_t[-\log P(S_1(3,t))] + E_t[-\log P(S_2(3,t))] - H(\mathbf{X}(3)) - \log|\det(\mathbf{W}(3))|$$

$$I(\mathbf{Y}(2)) = E_t[-\log P(S_1(2,t))] + E_t[-\log P(S_2(2,t))] - H(\mathbf{X}(2)) - \log|\det(\mathbf{W}(2))|$$

$$I(\mathbf{Y}(1)) = E_t[-\log P(S_1(1,t))] + E_t[-\log P(S_2(1,t))] - H(\mathbf{X}(1)) - \log|\det(\mathbf{W}(1))|$$

This invention $$I(\mathbf{Y}) = E_t[-\log P(S_1(1,t), S_1(2,t), S_1(3,t))] + E_t[-\log P(S_2(1,t), S_2(2,t), S_2(3,t))] - H(\mathbf{X}) - \log|\det(\mathbf{W})|$$

Case 2 (with permutation)

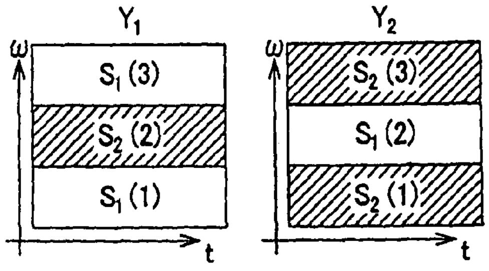

Prior art $$I(\mathbf{Y}(3)) = E_t[-\log P(S_1(3,t))] + E_t[-\log P(S_2(3,t))] - H(\mathbf{X}(3)) - \log|\det(\mathbf{W}(3))|$$

$$I(\mathbf{Y}(2)) = E_t[-\log P(S_2(2,t))] + E_t[-\log P(S_1(2,t))] - H(\mathbf{X}(2)) - \log|\det(\mathbf{W}(2))|$$

$$I(\mathbf{Y}(1)) = E_t[-\log P(S_1(1,t))] + E_t[-\log P(S_2(1,t))] - H(\mathbf{X}(1)) - \log|\det(\mathbf{W}(1))|$$

This invention $$I(\mathbf{Y}) = E_t[-\log P(S_1(1,t), S_2(2,t), S_1(3,t))] + E_t[-\log P(S_2(1,t), S_1(2,t), S_2(3,t))] - H(\mathbf{X}) - \log|\det(\mathbf{W})|$$

FIG.9

APPARATUS AND METHOD FOR SEPARATING AUDIO SIGNALS

CROSS REFERENCES TO RELATED APPLICATIONS

The present invention contains subject matter related to Japanese Patent Application JP 2005-018822 filed in the Japanese Patent Office on Jan. 26, 2005 and Japanese Patent Application JP 2005-269128 filed in the Japanese Patent Office on Sep. 15, 2005, the entire contents of which being incorporated herein by reference.

BACKGROUND OF THE INVENTION

1. Field of the Invention

This invention relates to an apparatus and a method for separating the component signals of an audio signal, which is a mixture of a plurality of component signals, by means of independent component analysis (ICA).

2. Description of the Related Art

The technique of independent component analysis (ICA) for separating and restoring a plurality of original signals that are linearly mixed by means of unknown coefficients, using only statistic independence, has been attracting attention in the field of signal processing. Then, it is possible to separate and restore an audio signal in a situation where a speaker and microphone are separated from each other and the microphone picks up sounds other than the voice of the speaker by applying the technique of independent composite analysis.

Now, how the component signals of an audio signal that is a mixture of a plurality of component signals are separated and restored by means of independent component analysis in the time-frequency domain will be discussed below.

Assume a situation where N different sounds are emitted from N audio sources and are observed by n microphones as illustrated in FIG. 1 of the accompanying drawings. Since the sounds (original signals) emitted from the audio sources undergo time lags and reflections before they get to the microphones, the signal (observation signal) $X_k(t)$ observed at the k-th microphone ($1 \leqq k \leqq n$) is expressed by formula (1) shown below for the total sum of convoluted operations of original signals and transfer functions. Then, the observation signals of all the microphones are expressed by a single formula (2) shown blow. Note that, in the formulas (1) and (2), x(t) and s(t) respectively represent column vectors having respective elements of $x_k(t)$ and $s_k(t)$ and A represents a matrix of n rows and N columns having elements of $a_{ij}(t)$. Also note that N=n is assumed in the following description.

[FORMULA 1]

$$x_k(t) = \sum_{j=1}^{N} \sum_{\tau=0}^{\infty} a_{kj}(\tau) s_j(t-\tau) = \sum_{j=1}^{N} \{a_{jk} * s_j(t)\} \tag{1}$$

-continued $$x(t) = A * s(t) \tag{2}$$

where $$s(t) = \begin{bmatrix} s_1(t) \\ \vdots \\ s_N(t) \end{bmatrix}$$

$$x(t) = \begin{bmatrix} x_1(t) \\ \vdots \\ x_n(t) \end{bmatrix}$$

$$A(t) = \begin{bmatrix} a_{11}(t) & \cdots & a_{1N}(t) \\ \vdots & \ddots & \vdots \\ a_{n1}(t) & \cdots & a_{nN}(t) \end{bmatrix}$$

In independent component analysis for a temporal, A and s(t) are not directly estimated but x(t) is transformed into a signal in the time-frequency domain and the signals that corresponds to A and s(t) are estimated in the time-frequency domain. The technique to be used for the analysis will be described below.

The signal vectors x(t) and s(t) are subjected to short-time Fourier transformation in a window of a length of L to produce X(ω, t) and S(ω, t). Similarly the matrix A(t) is subjected to short-time Fourier transform to produce A(ω). Then, the above formula (2) for the time domain can be expressed by formula (3) below Note that ω represents the number of frequency bin ($1 \leqq \omega \leqq M$) and t represents the frame number ($1 \leqq t \leqq T$). With independent component analysis in the time-frequency domain, S(ω, t) and A(ω) are estimated in the time-frequency domain:

[FORMULA 2]

$$X(\omega, t) = A(\omega) S(\omega, t) \tag{3}$$

where, $$X(\omega, t) = \begin{bmatrix} X_1(\omega, t) \\ \vdots \\ X_n(\omega, t) \end{bmatrix}$$

$$S(\omega, t) = \begin{bmatrix} S_1(\omega, t) \\ \vdots \\ S_n(\omega, t) \end{bmatrix}$$

The number of frequency bin is same as the length L of the window in the proper sense of the word and each frequency bin represents a frequency component that is produced when the span between −R/2 and R/2 (where R is the sampling frequency) is divided equally into L parts. Since the negative frequency components are respectively complex conjugates of the positive frequency components, they can be expressed by X(−ω)=conj(X(ω)) (where conj(·) is a complex conjugate, only the non-negative frequency components from 0 to R/2 (the number of frequencies bin being equal to L/2+1) are considered and the numbers from 1 to M (M=L/2+1) are assigned to the frequency components).

When estimating S(ω, t) and A(ω) in the time-frequency domain, firstly formula (4) as shown blow is taken into consideration. In the formula (4), Y(ω, t) represents the column vector having elements $Y_k(\omega, t)$ that are obtained by short-time Fourier transformation of $y_k(t)$ in a window with a length L and W(ω) represents a matrix (separate matrix) of n rows and n columns having elements $w_{ij}(\omega)$.

[FORMULA 3]

$$Y(\omega, t) = W(\omega)X(\omega, t) \tag{4}$$

where, $$Y(\omega, t) = \begin{bmatrix} Y_1(\omega, t) \\ \vdots \\ Y_n(\omega, t) \end{bmatrix}$$

$$W(\omega) = \begin{bmatrix} w_{11}(\omega) & \cdots & w_{1n}(\omega) \\ \vdots & \ddots & \vdots \\ w_{n1}(\omega) & \cdots & w_{nn}(\omega) \end{bmatrix}$$

Then, W(ω) that makes $Y_1$(ω, t) through $Y_n$(ω, t) statistically independent (that maximizes their independency to be more accurate) is determined by changing t, while holding w to a fixed value. Due to permutations and instable scaling that arise in independent component analysis in the time-frequency domain as will be described in greater detail hereinafter, solutions other than W(ω)=A(ω)$^{-1}$ can exist. As $Y_1$(ω, t) through $Y_n$(ω, t) that are statistically independent are obtained for all the values of w, it is possible to obtain isolated signals (component signals) y(t) by subjecting them to inverse Fourier transformation.

FIG. 2 of the accompanying drawings schematically illustrates the prior art independent component analysis in the time-frequency domain. Assume that the original signals that are emitted from n audio sources and independent from each other are $s_1$ through $s_n$ and the vector having them as elements is s. The observation signals x that are observed at respective microphones are obtained by performing convoluted/mixed operations in the above formula (2). FIG. 3A of the accompanying drawings shows as example observation signals that are obtained when the number of microphones n is equal to 2 and hence the number of channels is equal to 2. Then, the observation signals x are subjected to short-time Fourier transformation to obtain signals X of the time-frequency domain. If the elements of X are expressed by $X_k$(ω, t), $X_k$(ω, t) takes a complex value. The graphic expression of the absolute value |$X_k$(ω, t)| of $X_k$(ω, t), using shades of color, is referred to as spectrogram. FIG. 3B of the accompanying drawings shows spectrograms as examples. In FIG. 3B, the horizontal axis represents t (frame number) and the vertical axis represents ω (frequency bin number). In the following description, a signal itself in the time-frequency domain (a signal before being expressed by an absolute value) is also referred to as "spectrogram". Subsequently, isolated signals Y as shown in FIG. 3C are obtained by multiplying each frequency bin of the signal X by W(ω). Isolated signals y in the time domain as shown in FIG. 3D are obtained by subjecting the isolated signals Y to inverse Fourier transformation.

Many variations exist as for the scale for expressing independency and the algorithm for maximizing independency. As an example, independency is expressed by means of a Kullback-Leibler information quantity (to be referred to as "KL information quantity" hereinafter) and the natural gradient method is used for the algorithm for maximizing independency in the following description.

Take a frequency bin as shown in FIG. 4. If the frame number t of $Y_k$(ω, t) is made to vary between 1 and T and expressed by $Y_k$(ω), the KL information quantity I that is the scale for expressing the isolated signals $Y_1$(ω) through $Y_n$(ω) is defined by formula (5) below. In other words, the KL, information quantity I is defined as the value obtained by subtracting the simultaneous entropy H(Y(ω)) of the individual frequency bins (=ω) for all the channels from the total sum of the entropies H($Y_k$(ω)) of the frequency bins (=ω) for the individual channels. FIG. 5 shows the relationship between H($Y_k$(ω)) and H(Y(ω)) when n=2. In the formula (5), H($Y_k$(ω)) can be rewritten so as to read as the first term of formula (6) below because of the definition of entropy while H(Y(ω)) can be expanded to read as the second and third terms in the formula (6) from the above formula (4). In the formula (6), $P_{Yk}$(ω)(·) expresses the probability density function of $Y_k$(ω, t) and H(X(ω)) expresses the simultaneous entropy of the observation signals X(ω).

[FORMULA 4]

$$I(Y(\omega)) = \sum_{k=l}^{n} H(Y_k(\omega)) - H(Y(\omega)) \tag{5}$$

$$= \sum_{k=1}^{n} E_t\left[-\log P_{Y_{k(\omega)}}(Y_k(\omega, t))\right] - \log|\det(W(\omega))| - H(X(\omega)) \tag{6}$$

where, $$Y_k(\omega) = [\, Y_k(\omega, 1) \ \cdots \ Y_k(\omega, T) \,]$$

$$Y(\omega) = \begin{bmatrix} Y_1(\omega) \\ \vdots \\ Y_n(\omega) \end{bmatrix}$$

$$X(\omega) = [\, X(\omega, 1) \ \cdots \ X(\omega, T) \,]$$

The KL information quantity I(Y(ω)) becomes minimal (ideally equal to 0) when $Y_1$(ω) through $Y_n$(ω) are independent. The natural gradient method is used for the algorithm for determining the separation matrix W(ω) that minimizes the KL information quantity I (Y(ω)). With the natural gradient method, the direction for minimizing I(Y(ω)) is determined by means of formula (7) below and W(ω) is gradually changed in that direction as shown by formula (9) below for convergence. In the formula (7), W(ω)$^T$ shows the transposed matrix of W(ω). In the formula (9), η represents a learning coefficient (a very small positive value).

[FORMULA 5]

$$\Delta W(\omega) = -\frac{\partial I(Y(\omega))}{\partial W(\omega)} W(\omega)^T W(\omega) \tag{7}$$

$$= -\left\{E_t[-\phi(Y(\omega, t))X(\omega, t)^T] - (W(\omega)^T)^{-1}\right\} W(\omega)^T W(\omega) \tag{8}$$

$$= \{I_n + E_t[\phi(Y(\omega, t))Y(\omega, t)^T]\} W(\omega)$$

$$W(\omega) \leftarrow W(\omega) + \eta \cdot \Delta W(\omega) \tag{9}$$

where, $$Y(\omega, t) = \begin{bmatrix} Y_1(\omega, t) \\ \vdots \\ Y_n(\omega, t) \end{bmatrix}$$

$$\phi(Y(\omega, t)) = \begin{bmatrix} \phi_1(Y_1(\omega, t)) \\ \vdots \\ \phi_n(Y_n(\omega, t)) \end{bmatrix}$$

$$\phi_k(Y_k(\omega, t)) = \frac{\partial}{\partial Y_k(\omega, t)} \log P_{Y_{k(\omega)}}(Y_k(\omega, t)) = \frac{\frac{\partial}{\partial Y_k(\omega, t)} P_{Y_{k(\omega)}}(Y_k(\omega, t))}{P_{Y_k(\omega)}(Y_k(\omega, t))}$$

The above formula (7) can be modified so as to read as formula (8) above. In the formula (8), Et[·] represents the average in the temporal direction and $\phi$ (·) represents the differential of the logarithm of a probability density function that is referred to as score function (or "activation function"). While a score function includes the probability density function of $Y_k(\omega)$, it is known that it is not necessary to use a real probability density function for the purpose of determining the smallest value of the KL, information quantity and probability density functions of two different types as shown in Table 1 can be used in a switched manner depending on if the distribution of $Y_k(\omega)$ is super-gaussian or sub-gaussian.

TABLE 1

| distribution of $Y_k(\omega)$ | score function | probability density function |
|---|---|---|
| super-gaussian | $-\text{thna}[Y_k(\omega, t)]$ | $h/\cosh[Y_k(\omega, t)]$ |
| sub-gaussian | $-Y_k(\omega, t)^3$ | $h \exp[-Y_k(\omega, t)^4/4]$ |

Alternatively, probability density functions of two different types as shown in Table 2 may be used in a switched manner as extended infomax method.

TABLE 2

| distribution of $Y_k(\omega)$ | score function | probability density function |
|---|---|---|
| super-gaussian | $-[Y_k(\omega, t) + \tanh[Y_k(\omega, t)]]$ | $h \exp[-Y_k(\omega, t)^2/2]/\cosh[Y_k(\omega, t)]$ |
| sub-gaussian | $-[Y_k(\omega, t) - \tanh[Y_k(\omega, t)]]$ | $h \exp[-Y_k(\omega, t)^2/2]\cosh[Y_k(\omega, t)]$ |

In Tables 1 and 2, h represents a constant for making the value of the integral of the probability density function in the interval between $-\infty$ and $+\infty$ equal to 1. If the distribution of $Y_k(\omega)$ is super-gaussian or sub-gaussian is determined according to if the value of the cumulant of the fourth degree ×4 ($=Et[Y_k(\omega, t)^4]-3Et[Y_k(\omega, t)^2]^2$) is positive or negative. It is super-gaussian when ×4 is positive and sub-gaussian when ×4 is negative.

FIG. 6 is a flowchart of a separation process using the above formula (8) and (9). Referring to FIG. 6, firstly in Step S101, a separation matrix W(ω) is prepared for each frequency bin and substituted by an initial value (e.g., unit matrix). Then, in the next step, or Step S102, it is determined if W(ω) converges or not for all the frequency bins and the process is terminated if it converges but made to proceed to Step S103 if it does not converge. In Step S103, Y(ω, t) is defined as the above formula (4) and, in Step S104, the direction for minimizing the KL information quantity I(Y(ω)) is determined by means of the above formula (8). Then, in the next step, or Step S105, W(ω) is updated in the direction for minimizing the KL information quantity I(Y(ω)) according to the above formula (9) and returns to Step S102. The processing operations in Steps S102 through S105 are repeated until the level of independence of Y(ω) is sufficiently raised for each frequency bin and W(ω) substantially converges.

SUMMARY OF THE INVENTION

Meanwhile, for independent component analysis in the time-frequency domain, a signal separation process is conducted for each frequency bin and the relationship among frequency bins is not considered. Therefore, if the process of signal separation is completed successfully, there can arise a problem of disunity for scaling and also that of disunity for the destinations of the isolated signals among the frequency bins. The problem of disunity for scaling can be dissolved by a method of estimating an observation for each audio source. On the other hand, the problem of disunity for destinations of the isolated signals refers to a phenomenon where, for instance, a signal coming from $S_1$ appears as $Y_1$ for ω=1, whereas a signal coming from $S_2$ appears as $Y_2$ for ω=2. It is also referred to as a problem of permutation.

FIG. 7 illustrates an example of occurrence of permutation. It occurs as a result of an attempt of separating two signals in the initial 32,000 samples of the file "X_rms2.wav" found in the WEB page (http://www.ism.ac.jp/~shiro/research/blindsep.html) in the time-frequency domain by means of an extended infomax method. One of the original signals is a voice saying "one, two, three" and the other is music. When the spectrograms of the upper row are subjected to inverse Fourier transformation in order to obtain signals in the time domain, waveforms of a mixture of the two signals as shown in the lower row appears in the both channels. When a signal separation process is conducted for each frequency bin, a result similar to that of FIG. 7 can inevitably appear depending on the type of observation signal and the initial value of separation matrix W(ω).

A switching method that is adapted to be used as post-processing is known as a method for dissolving the problem of permutation. With the post processing method, spectrograms as shown in FIG. 7 is obtained by separation for each frequency bin and spectrograms that are free from permutation are obtained by switching the isolated signals between the channels according to a certain criterion or another. Criteria that can be used for the switching method include (a) the use of similarity of envelopes (see Non-Patent Document 1: Noboru Murata, "Independent Component Analysis for Beginners", Tokyo Denki University Press), (b) the use of the direction of an estimated audio source (see "Description of the Related Art" in Patent Document 1: Jpn. Pat. Appln. Laid-Open Publication No. 2004-145172) and (c) a combination of (a) and (b) (see Patent Document 1).

However, (a) gives rise to a switching error when the difference of envelopes is not clear depending on frequency bins. Once a switching error occurs, the destinations of the isolated signals can be errors in all the succeeding frequency bins. On the other hand, (b) is accompanied by a problem of accuracy of the estimated direction and requires positional information on the microphones. Finally, while (c) that is a combination of (a) and (b) shows an improved accuracy, it also requires positional information on the microphones. Additionally, all the above-cited methods involve two steps including a step of separation and a step of switching and hence entail a long processing time. From the viewpoint of processing time, while it is desirable that the problem of permutation is dissolved when the signal separation is completed, a method that involves a post-processing operation does not allow such an early dissolution of the problem.

Non-Patent Documents 2 (Mike Davies, "Audio Source Separation", Oxford University Press, 2002 http://www.elec.qmul.ac.uk/staffinfo/miked/publications/IMA.ps) and Non-Patent Document 3 (Nikolaos Mitianoudis and Mike Davies, A fixed point solution for convolved audio source separation", IEEE WASPAA01, 2001 (http://egnatia.ee.auth.gr/~mitia/pdf/waspaa01.pdf) propose a frequency coupling method for reflecting the relationship among frequency bins to an updated expression of a separation matrix W. With this method, a probability density function as expressed by formula (10) below and an updated expression of a separation matrix W as expressed by formula (11) below are used (note that the symbols same as those of this specification are used for the variables of the formulas). In the formulas (10) and (11), βk(t) represents the average of the absolute values of the components of Yk(ω, t) and β(t) represents the diagonal matrix having β1, . . . , βn(t) as diagonal elements. Due to the introduction of βk(t), it is possible to reflect the relationship among frequency bins is reflected to ΔW(ω).

[FORMULA 6]

$$P(Y_k(\omega, t)) \propto \beta_k(t)^{-1}\exp\{-h(Y_k(\omega, t)/\beta_k(t))\} \quad (10)$$

$$\Delta W(\omega) = \{I_n - \beta(t)^{-1}\phi(Y(\omega, t))Y(\omega, t)^H\}W(\omega) \quad (11)$$

where, $$\beta(t) = diag\,(\beta_1(t), \ldots , \beta_n(t))$$

$$\beta_k(t) = \frac{1}{M}\sum_{\omega=1}^{M}|Y_k(\omega, t)|$$

$$\phi(Y(\omega, t)) = \begin{bmatrix} \phi_1(Y_1(\omega, t)) \\ \vdots \\ \phi_n(Y_n(\omega, t)) \end{bmatrix}$$

$$\phi_k(Y_k(\omega, t)) = \frac{Y_k(\omega, t)}{|Y_k(\omega, t)|}$$

However, with the separation matrix W that is made to converge by repeatedly applying the above formula (11) cannot necessarily dissolve the problem of permutation. In other words, there is no guarantee that the KL information quantity at the time when no permutation occurs is smaller than the KL information quantity at the time when a permutation occurs. FIG. 8 illustrates the results obtained by an operation of signal separation conducted in the initial 32,000 samples of the above-cited file "X_rms2.wav". Like FIG. 7, the separation in each frequency bin is successful but permutation is still present, although the problem of permutation is made less remarkable in FIG. 8 if compared with FIG. 7.

The present invention has been made in view of the above-identified problems of the prior art, and it is desirable to provide an apparatus and a method for separating audio signals that can dissolve the problem of permutation without conducting a post processing operation after the signal separation when separating the plurality of mixed signals by independent component analysis.

According to the present invention, there is provided an audio signal separation apparatus for separating observation signals in the time domain of a mixture of a plurality of signals including audio signals into individual signals by means of independent component analysis to produce isolated signals, the apparatus including first conversion means for converting the observation signals in the time domain into observation signals in the time-frequency domain, separation means for producing isolated signals in the time-frequency domain from the observation signals in the time-frequency domain, and second conversion means for converting the isolated signals in the time-frequency domain into isolated signals in the time domain, the separation means being adapted to produce isolated signals in the time-frequency domain from the observation signals in the time-frequency domain and a separation matrix substituted by initial values, compute the modified value of the separation matrix by using a score function using the isolated signals in the time-frequency domain and a multidimensional probability density function and the separation matrix, modify the separation matrix until the separation matrix substantially converges by using the modified value and produce isolated signals in the time-frequency domain by using the substantially converging separation matrix.

According to the present invention, there is provided an audio signal separation method of separating observation signals in the time domain of a mixture of a plurality of signals including audio signals into individual signals by means of independent component analysis to produce isolated signals, the method including a step of converting the observation signals in the time domain into observation signals in the time-frequency domain, a step of producing isolated signals in the time-frequency domain from the observation signals in the time-frequency domain and a separation matrix substituted by initial values, a step of computing the modified value of the separation matrix by using a score function using the isolated signals in the time-frequency domain and a multidimensional probability density function and the separation matrix, a step of modifying the separation matrix until the separation matrix substantially converges by using the modified value, and a step of converting the isolated signals in the time-frequency domain produced by using the substantially converging separation matrix into isolated signals in the time domain.

Thus, with an apparatus and a method for separating audio signals according to the present invention, when separating observation signals in the time domain of a mixture of a plurality of signals including audio signals into individual signals by means of independent component analysis to produce isolated signals, it is possible to dissolve the problem of permutation without performing any post-processing operation after the separation of the audio signals by producing isolated signals in the time-frequency domain from a separation matrix substituted by initial values, computing the modified value of the separation matrix by using a score function using the isolated signals in the time-frequency domain and a multidimensional probability density function and the separation matrix, modifying the separation matrix until the separation matrix substantially converges by using the modified value and converting the isolated signals in the time-frequency domain produced by using the substantially converging separation matrix into isolated signals in the time domain.

BRIEF DESCRIPTION OF THE DRAWINGS

FIG. 9 is a schematic illustration of the logical basis for the theory of dissolving the problem of permutation by using a multidimensional probability density function;

DETAILED DESCRIPTION OF THE PREFERRED EMBODIMENTS

Now, the present invention will be described in greater detail by referring to the accompanying drawings that illustrate a preferred embodiment of the invention. The illustrated embodiment is an audio signal separation apparatus for separating the component signals of an audio signal, which is a mixture of a plurality of component signals, by means of independent component analysis. Particularly, this embodiment of audio signal separation apparatus can dissolve the problem of permutation without the necessity of post-processing by computationally determining the entropy of a spectrogram by means of a multidimensional probability density function instead of computationally determining the entropy of each frequency bin by means of a one-dimensional probability density function as in the case of the prior art. In the following, the logical basis for the theory of dissolving the problem of permutation by using a multidimensional probability density function and specific formulas to be used for the embodiment will be described first and then the specific configuration of the audio signal separation apparatus of this embodiment will be described.

Firstly, the logical basis for the theory of dissolving the permutation problem by using a multidimensional probability density function will be described by referring to FIG. 9. For the sake of simplicity, the number of channels is made equal to two (n=2) and the total number of frequency bins is made equal to three (M=3) in FIG. 9. However, it will be appreciated that the following description is applicable to any number of n and M.

Referring to FIG. 9, the case where frequency bins are successfully separated and no permutation takes place is referred to as Case 1, whereas the case where frequency bins are successfully separated but permutation takes place when ω=2 is referred to as Case 2.

When the KL information quantity I(Y(ω)) that is computationally determined from each frequency bin is minimized according to the prior art, I(Y(2)) shows a same value for both Case 1 and Case 2, although permutation takes place at ω=2 in Case 2.

Figure 10A:
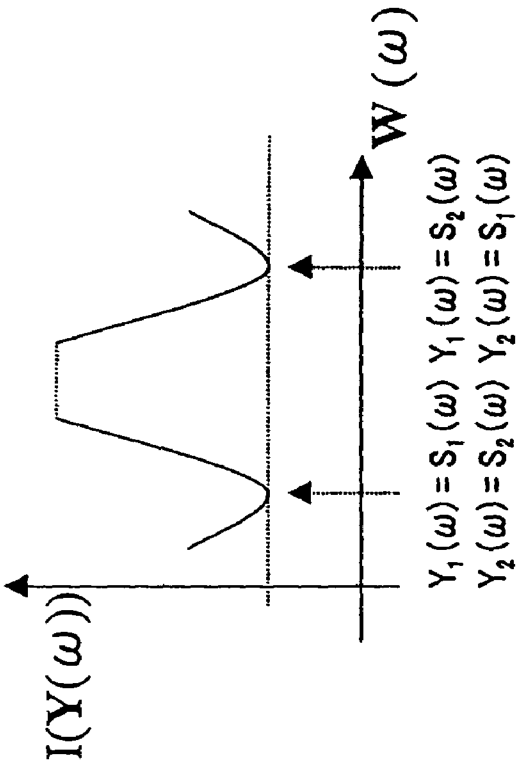
FIGS. 10A and 10B are schematic illustrations of the difference in the KL information quantity between appearance and non-occurrence of permutation according to the present invention as compared with the prior art.

FIG. 10A schematically illustrates the relationship between the KL information quantity I(Y(ω)) and the separation matrix W(ω) (although it is not possible to express W(ω) by means of a single axis) of the prior art. Since a minimized KL information quantity is used for both Case 1 and that of Case 2, it is not possible to discriminate the two cases. Here lies the intrinsic cause of the occurrence of permutation when the prior art is used.

Figure 10B:
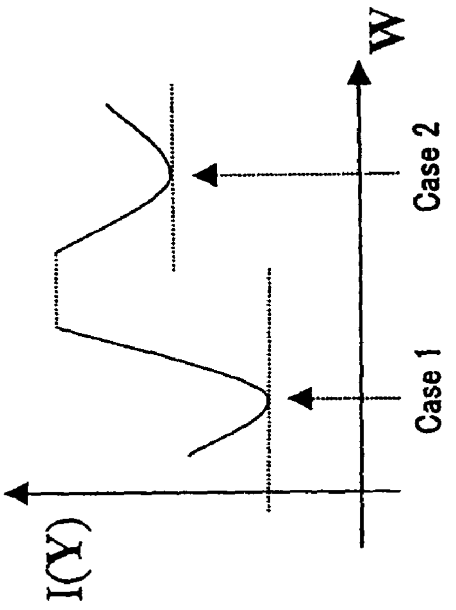

To the contrary, with the audio signal separation apparatus of this embodiment, the entropy of each channel is computed by means of a multidimensional probability density function and then a single KL information quantity is computationally determined for all the channels (the formulas to be used for the computations will be described in greater detail hereinafter). Since a single KL information quantity is computationally determined for all the channels with this embodiment, the KL information quantity is different between Case 1 and Case 2. It is possible to make the KL information quantity of Case 1 smaller than that of Case 2 by using an appropriate multidimensional probability density function. FIG. 10B schematically illustrates the relationship between the KL information quantity I(Y) and the separation matrix W(ω) of this embodiment so that it is possible to discriminate the two cases. Therefore, unlike the prior art, it is possible with this embodiment to separate signals and, at the same time, prevent permutation from taking place simply by minimizing the KL information quantity without requiring a switching operation as post-processing.

With this embodiment, when there is a case where signals are separated with $Y_1=S_2$ and $Y_2=S_1$ for all the frequency bins (to be referred to as Case 3 hereinafter), it is not possible to discriminate Case 1 and Case 3 because the KL information quantity is same for the two cases. However, no problem arises if the outcome of separation is Case 3 because permutation takes place in Case 3.

When introducing a multidimensional probability density function into independent component analysis in the time-frequency domain, it is necessary to answer three questions including (a) what formula is to be used for updating the separation matrix, (b) how to handle complex numbers and (c) what multidimensional probability density function is to be used. These three problems will be discussed sequentially below and then (d) a modified answer will be described.

(A) Formula for Updating the Separation Matrix W

Since a one-dimensional probability density function is used in the above-described formulas (5) through (9), they cannot be applied to a multidimensional probability density function without modifying them. In this embodiment, a formula for updating the separation matrix W using a multidimensional probability density function is led out by following the process as described below.

The formula (4) for defining the relationship between the observation signal X and the isolated signal Y is used to produce expressions of the relationship for all values of ω(1≦ωM), which expressions are then put into a single formula of (12) or (15) (but the formula (12) is selected and used hereinafter). Formula (13) below is an expression using a single variable for the vectors and the matrices of the formula (12). Formula (14) below is an expression using a single variable for the vectors and the matrices of the formula (12) that is derived from the same channel. In the formula (14), $Y_k(t)$ expresses a column vector formed by cutting out a frame from the spectrogram and W expresses a diagonal matrix having elements $w_{ij}(1), \ldots, w_{ij}(M)$.

Figure 11:
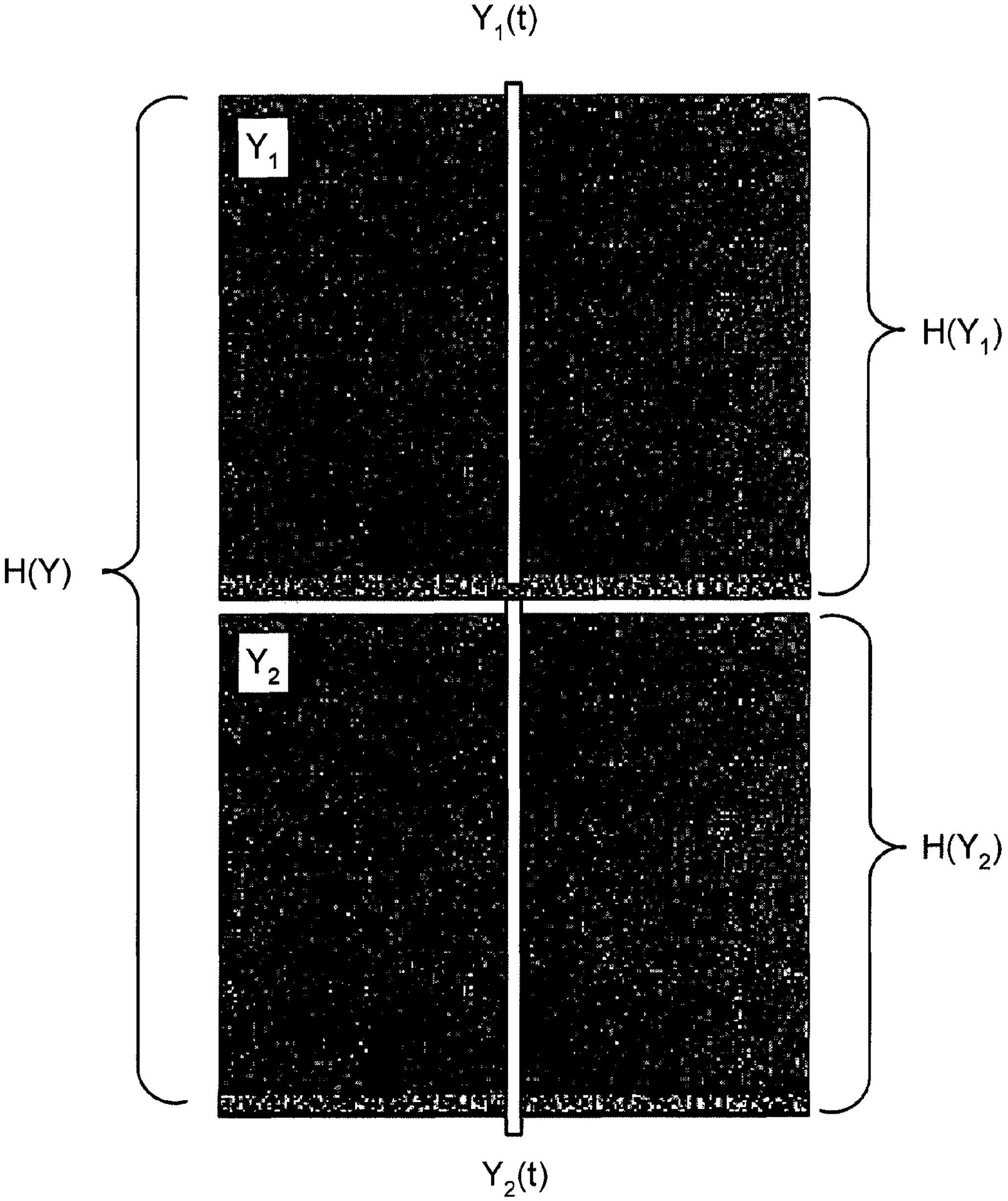
FIG. 11 is a schematic illustration of entropy and simultaneous entropy of an embodiment of the present invention.

In this embodiment, the KL information quantity I(Y) is defined by formula (16) below, using Yk(t) and Y(t) in the formulas (12) through (14). In the formula (16), H(Yk) represents the entropy of a spectrogram of each channel and H(Y) represents the joint entropy of a spectrogram of all the channels. FIG. 11 illustrates the relationship between H(Yk) and H(Y) for n=2. In the formula (16), H(Yk) is rewritten so as to read as the first term of formula (17) below due to the definition of entropy. Due to the formula (13) above, H(Y) can be developed so as to read as the second and third terms in the formula (17) below. In the formula (17), PYk(·) represents the M-dimensional probability density function of Yk(1, t), . . . , Yk(M, t) and H(x) represents the simultaneous entropy of the observation signals X.

[FORMULA 7]

$$\begin{bmatrix} Y_1(1,t) \\ \vdots \\ Y_1(M,t) \\ \hline Y_2(1,t) \\ \vdots \\ Y_2(M,t) \\ \hline \vdots \\ \hline Y_n(1,t) \\ \vdots \\ Y_n(M,t) \end{bmatrix} = \left[\begin{array}{cc|cc|c|cc} w_{11}(1) & 0 & w_{12}(1) & 0 & \cdots & w_{1n}(1) & 0 \\ & \ddots & & \ddots & \cdots & & \ddots \\ 0 & w_{11}(M) & 0 & w_{12}(M) & \cdots & 0 & w_{1n}(M) \\ \hline w_{21}(1) & 0 & w_{22}(1) & 0 & \cdots & w_{2n}(1) & 0 \\ & \ddots & & \ddots & \cdots & & \ddots \\ 0 & w_{21}(M) & 0 & w_{22}(M) & \cdots & 0 & w_{2n}(M) \\ \hline \vdots & \vdots & \vdots & \vdots & \therefore & \vdots & \vdots \\ \hline w_{n1}(1) & 0 & w_{n2}(1) & 0 & \cdots & w_{nn}(1) & 0 \\ & \ddots & & \ddots & \cdots & & \ddots \\ 0 & w_{n1}(M) & 0 & w_{n2}(M) & \cdots & 0 & w_{nn}(M) \end{array}\right] \times \begin{bmatrix} X_1(1,t) \\ \vdots \\ X_1(M,t) \\ \hline X_2(1,t) \\ \vdots \\ X_2(M,t) \\ \hline \vdots \\ \hline X_n(1,t) \\ \vdots \\ X_n(M,t) \end{bmatrix} \quad (12)$$

$$\Leftrightarrow Y(t) = WX(t) \quad (13)$$

$$\Leftrightarrow \begin{bmatrix} Y_1(t) \\ Y_2(t) \\ \vdots \\ Y_n(t) \end{bmatrix} = \begin{bmatrix} W_{11} & W_{12} & \cdots & W_{1n} \\ W_{21} & W_{22} & \cdots & W_{2n} \\ \vdots & \vdots & \ddots & \vdots \\ W_{n1} & W_{n2} & \cdots & W_{nn} \end{bmatrix} \times \begin{bmatrix} X_1(t) \\ X_2(t) \\ \vdots \\ X_n(t) \end{bmatrix} \quad (14)$$

where, $$Y_k(t) = \begin{bmatrix} Y_k(1,t) \\ \vdots \\ Y_k(M,t) \end{bmatrix}$$

$$W_{ij} = diag(w_{ij}(1), \ldots, w_{ij}(M))$$

$$X_k(t) = \begin{bmatrix} X_k(1,t) \\ \vdots \\ X_k(M,t) \end{bmatrix}$$

[FORMULA 8]

$$\begin{bmatrix} Y_1(1,t) \\ \vdots \\ Y_n(1,t) \\ \hline Y_1(2,t) \\ \vdots \\ Y_n(2,t) \\ \hline \vdots \\ \hline Y_1(M,t) \\ \vdots \\ Y_n(M,t) \end{bmatrix} = \left[\begin{array}{ccc|ccc|c|ccc} w_{11}(1) & \cdots & w_{1n}(1) & & & & \cdots & & & \\ \vdots & \ddots & \vdots & & 0 & & \cdots & & 0 & \\ w_{n1}(1) & \cdots & w_{nn}(1) & & & & \cdots & & & \\ \hline & & & w_{11}(2) & \cdots & w_{1n}(2) & \cdots & & & \\ & 0 & & \vdots & \ddots & \vdots & \cdots & & 0 & \\ & & & w_{n1}(2) & \cdots & w_{nn}(2) & \cdots & & & \\ \hline \vdots & \vdots & \vdots & \vdots & \vdots & \vdots & \therefore & \vdots & \vdots & \vdots \\ \hline & & & & & & \cdots & w_{11}(M) & \cdots & w_{1n}(M) \\ & 0 & & & 0 & & \cdots & \vdots & \ddots & \vdots \\ & & & & & & \cdots & w_{n1}(M) & \cdots & w_{nn}(M) \end{array}\right] \times \begin{bmatrix} X_1(1,t) \\ \vdots \\ X_n(1,t) \\ \hline X_1(2,t) \\ \vdots \\ X_n(2,t) \\ \hline \vdots \\ \hline X_1(M,t) \\ \vdots \\ X_n(M,t) \end{bmatrix} \quad (15)$$

[FORMULA 9]

$$I(Y)=\sum_{k=1}^{n}H(Y_k)-H(Y) \tag{16}$$

$$=\sum_{k=1}^{n}E_t[-\log P_{Y_k}(Y_k(t))]-\log|\det(W)|-H(X) \tag{17}$$

where, $$Y_k=[\,Y_k(1)\ \cdots\ Y_k(T)\,]$$

$$Y=\begin{bmatrix}Y_1\\ \vdots\\ Y_n\end{bmatrix}$$

$$X=[\,X(1)\ \cdots\ X(T)\,]$$

In order to separate observation signals X, it is only necessary to determine a separation matrix W that minimizes the KL, information quantity I(Y). Such a separation matrix W can be determined by updating W little by little according to formulas (18) and (19) shown below.

[FORMULA 10]

$$\Delta W=-\frac{\partial I(Y)}{\partial W}W^TW \tag{18}$$

$$W\leftarrow W+\eta\cdot\Delta W \tag{19}$$

Note that it is only necessary to update the non-zero elements in the above formula (12) in order to update W. The matrices ΔW(ω) and W(ω) formed by taking out only the components of the frequency bin=ω from ΔW and W respectively are defined by formulas (20) and (21) below and ΔW(ω) is computationally determined according to formula (22) below. All the non-zero elements of ΔW are determined by computing the formula (22) for all values of ω. In the formula (22), ϕω(·) represents the score function that corresponds to the multidimensional probability density function and formula (24) below can be obtained by way of formula (23) below. In other words, it can be obtained by partially differentiating the logarithm of the multidimensional probability density function by the ω-th argument.

[FORMULA 11]

$$\Delta W(\omega)=\begin{bmatrix}\Delta w_{11}(\omega) & \cdots & \Delta w_{1n}(\omega)\\ \vdots & \ddots & \vdots\\ \Delta w_{n1}(\omega) & \cdots & \Delta w_{nn}(\omega)\end{bmatrix} \tag{20}$$

$$W(\omega)=\begin{bmatrix}w_{11}(\omega) & \cdots & w_{1n}(\omega)\\ \vdots & \ddots & \vdots\\ w_{n1}(\omega) & \cdots & w_{nn}(\omega)\end{bmatrix} \tag{21}$$

$$\Delta W(\omega)=\{I_n+E_t[\phi_\omega(Y(t))Y(\omega,t)^T]\}W(\omega) \tag{22}$$

where, (23)

$$\phi_\omega(Y(t))=\begin{bmatrix}\phi_{1\omega}(Y_1(t))\\ \vdots\\ \phi_{n\omega}(Y_n(t))\end{bmatrix}$$

-continued $$\phi_{k\omega}(Y(t))\frac{\partial}{\partial Y_k(\omega,t)}\log P_{Y_k}(Y_k(t))=\frac{\frac{\partial}{\partial Y_k(\omega,t)}P_{Y_k}(Y_k(t))}{P_{Y_k}(Y_k(t))} \tag{24}$$

The difference between the formula (8) and the formula (22) shown above lies in the argument of the score function. Since the argument of ϕ (·) of the above formula (8) includes only the elements of the frequency bin=ω, it is not possible to reflect the correlation with other frequency bins. On the other hand, the argument of ϕω(·) of the above formula (22) includes the elements of all the frequency bins, it is possible to reflect the correlation with the other frequency bins.

As will be described in greater detail hereinafter, Y is a signal of a complex number and hence a formula that matches complex numbers will actually be used instead of the above formula (22).

As the separation matrix W is repeatedly updated, the values of the elements may overflow depending on the type of the multidimensional probability density function to be used.

Therefore, the equation of ΔW in the formula (22) may be altered as shown below in order to prevent the values of the elements of the separation matrix W from overflowing.

The row vectors $\Delta W_k(\omega)$ and $W_k(\omega)$ formed by taking out the k-th rows of the matrices ΔW(ω) and W(ω) in the above formulas (20) and (21) are defined by formulas (25) and (26) shown below respectively.

[Formula 12]

$$\Delta W_k(\omega)=[\Delta w_{k1}(\omega)\ldots\Delta w_{kn}(\omega)] \tag{25}$$

$$W_k(\omega)=[w_{k1}(\omega)\ldots w_{kn}(\omega)] \tag{26}$$

Figure 12:
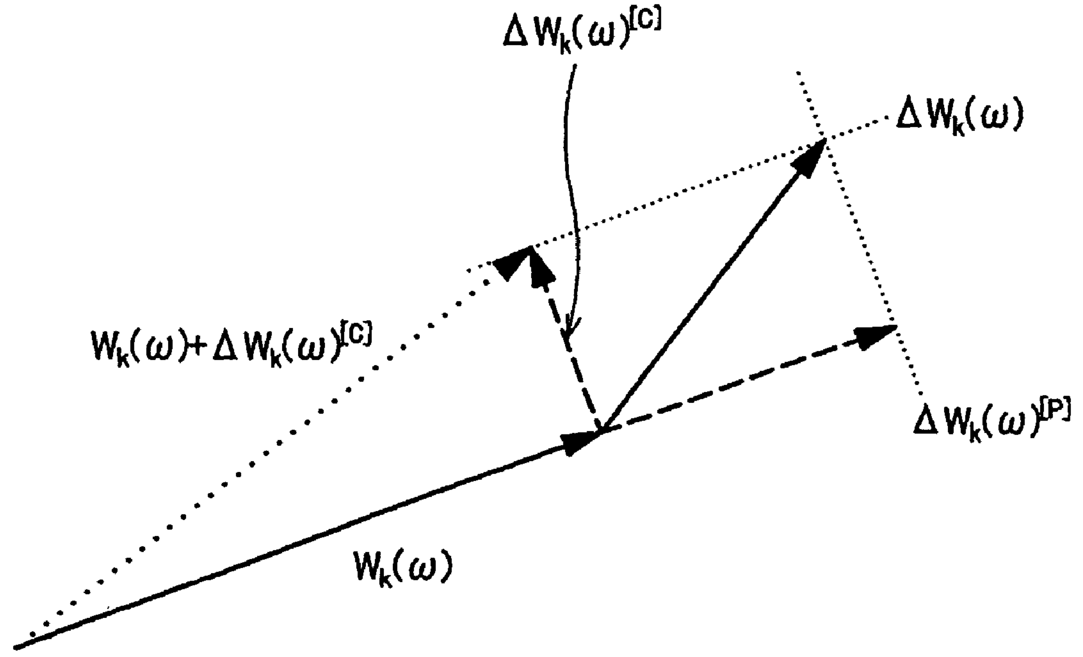
FIG. 12 is a schematic illustration of the decomposition of the row vector $\Delta W_k(\omega)$ of a modified value $\Delta W(\omega)$ of a separation matrix $W(\omega)$ into a component $\Delta W_k(\omega)[C]$ perpendicular to the row vector $W_k(\omega)$ and a component $\Delta W_k(\omega)[P]$ parallel to the row vector $W_k(\omega)$ of the separation matrix.

$W_k(\omega)$ expresses a vector for producing an isolated signal Y of the channel k and the frequency bin=ω from the ω-th frequency bin of the observation signal X but if the signal is isolated or not is determined by the ratio of the elements of $W_k(\omega)$ (ratio of the observation signals) and does not relate to the size of $W_k(\omega)$. For example, to mix observation signals at a ratio of −1:2 and to mix observation signals at a ratio of −2:4 are same from the viewpoint of isolation of a signal. When $\Delta W_k(\omega)$ is decomposed into component $\Delta W_k(\omega)$[C] that is perpendicular to $W_k(\omega)$ and component $\Delta W_k(\omega)$[P] that is parallel to $W_k(\omega)$ as shown in FIG. 12, $\Delta W_k(\omega)$[C] contributes to the isolation of the signal but $\Delta W_k(\omega)$[P] only makes $W_k(\omega)$ larger and does not contribute to the isolation of the signal. As pointed out earlier, the problem of overflow can take place when $W_k(\omega)$ becomes too large.

Therefore, it is possible to prevent overflow from taking place and only isolate the signal by updating $W_k(\omega)$ only by using $\Delta W_k(\omega)$[C] instead of updating $W_k(\omega)$ by using $\Delta W_k(\omega)$.

More specifically, $\Delta W_k(\omega)$[C] is computationally determined by means of formula (27) below and W(ω) is updated by using matrix ΔW(ω)[C] that is formed by $\Delta W_k(\omega)$[C] as shown in formula (28) below.

[FORMULA 13]

$$\Delta W_k(\omega)^{[C]}=\Delta W_k(\omega)-\Delta W_k(\omega)^{[P]}=\Delta W_k(\omega)-\frac{\Delta W_k(\omega)W_k(\omega)^H}{W_k(\omega)W_k(\omega)^H}W_k(\omega) \tag{27}$$

-continued $$W(\omega) \leftarrow W(\omega) + \eta \cdot \Delta W(\omega)^{[C]} \tag{28}$$

where, $$\Delta W(\omega)^{[C]} = \begin{bmatrix} \Delta w_{11}(\omega)^{[C]} & \cdots & \Delta w_{1n}(\omega)^{[C]} \\ \vdots & \ddots & \vdots \\ \Delta w_{n1}(\omega)^{[C]} & \cdots & \Delta w_{nn}(\omega)^{[C]} \end{bmatrix}$$

Of course, W may be updated by using component ΔW[C] that is perpendicular to W as shown in formula (29) below. Furthermore, W may be updated without totally disregarding component ΔW[P] that is parallel to W and by multiplying ΔW[C] and ΔW [P] by respective coefficients $\eta_1$ and $\eta_{12}$ ($\eta_1 > \eta_2 > 0$) that are different from each other.

[Formula 14]

$$W \leftarrow W + \eta \cdot \Delta W^{[C]} \tag{29}$$

$$W(\omega) \leftarrow W(\omega) + \eta_1 \cdot \Delta W(\omega)^{[C]} + \eta_2 \cdot \Delta W(\omega)^{[P]} \tag{30}$$

(B) How to Handle Complex Numbers

To handle signals of complex numbers with independent component analysis in the time-frequency domain, it is necessary to make the updating formula of W to be able to cope with complex numbers. For the known method using a one-dimensional probability density function, the formula (31) shown below that is made to be able to cope with complex numbers by using the above-described formula (8) has been proposed (see Jpn. Pat. Appln. Laid-Open Publication No. 2003-84793). In the formula (31), the superscript of "H" represents the complex conjugate transposition (transposition of vector and replacement of elements with conjugate complex numbers).

[FORMULA 15]

$$\Delta W(\omega) = \{I_n + E_t[\hat{\phi}(Y(\omega, t))Y(\omega, t)^H]\}W(\omega) \tag{31}$$

where, $$\hat{\phi}(Y(\omega, t)) = \begin{bmatrix} \hat{\phi}_1(Y_1(\omega, t)) \\ \vdots \\ \hat{\phi}_n(Y_n(\omega, t)) \end{bmatrix}$$

$$\hat{\phi}_k(Y_k(\omega, t)) = \phi_k(|Y_k(\omega, t)|)\frac{Y_k(\omega, t)}{|Y_k(\omega, t)|}$$

However, the above formula (31) cannot be applied to a method using a multidimensional probability density function. Therefore, in this embodiment, formula (32) shown below is devised and the separation matrix W is updated on the basis of the formula (32). Note that while φ kω(·) is expressed as a function that takes M arguments in formula (33) shown below, it is equivalent with φ kω($Y_k$(t)) (a function that takes M-dimensional vectors as arguments) of the above-described formula (24). It is possible to make a score function to be able to cope with complex numbers by substituting the absolute values of the arguments and multiplying the return value of the function by the phase component $Y_k(\omega, t)/|Y_k(\omega, t)|$ of the ω-th argument as shown in the formula (33).

[FORMULA 16]

$$\Delta W(\omega) = \{I_n + E_t[\hat{\phi}_\omega(Y(t))Y(\omega, t)^H]\}W(\omega) \tag{32}$$

where, $$\hat{\phi}_\omega(Y(t)) = \begin{bmatrix} \hat{\phi}_{1\omega}(Y_1(t)) \\ \vdots \\ \hat{\phi}_{n\omega}(Y_n(t)) \end{bmatrix}$$

$$\hat{\phi}_{k\omega}(Y_k(t)) = \phi_{k\varpi}(|Y_k(1, t)|, \ldots, |Y_k(M, t)|)\frac{Y_k(\omega, t)}{|Y_k(\omega, t)|} \tag{33}$$

In the formula (32), it may be needless to say that the component ΔW(ω))[C] that is perpendicular to W(ω) may be used for computations as in the case of the above-described formula (27).

As will be discussed hereinafter, certain multidimensional probability density functions and score functions can cope with inputs (arguments) of complex numbers from the beginning. The transformation of the above formula (33) is not necessary for such functions. Then, φ that is hatted with (^) is regarded to be same as φ.

(C) What Multidimensional Probability Density Function is To be Used

A multidimensional (multivariate) normal distribution expressed by formula (34) below is well known as multidimensional probability density function. In the formula (34), x represents column vectors of $x_1, \ldots, X_d$ and μ represents the average value vector of x and Σ represents the variance/covariance matrix of x.

[FORMULA 17]

$$P(x) = \frac{1}{\sqrt{(2\pi)^d|\Sigma|}}\exp\left(-\frac{1}{2}(x-\mu)^T\sum^{-1}(x-\mu)\right) \tag{34}$$

where, $$x = \begin{bmatrix} x_1 \\ \vdots \\ x_d \end{bmatrix}$$

$$\mu = \begin{bmatrix} E[x_1] \\ \vdots \\ E[x_d] \end{bmatrix}$$

However, it is known that signals cannot be separated when a normal distribution is used as probability density function for independent component analysis. Therefore, it is necessary to use a multidimensional probability density function other than a normal distribution. In this embodiment, a multidimensional probability density function is devised on the basis of (i) spherical distribution, (ii) $L_N$ norm, (iii) elliptical distribution and (iv) copula model.

(I) Spherical Distribution

A spherical distribution refers to a probability density function that is made multidimensional by substituting an arbitrarily selected non-negative function f(x) (where x is a scalar) with the L2 norm of vector. An L2 norm refers to the square root of the total sum of the squares of the absolute values of elements. In this embodiment, a one-dimensional probability density function (such as an exponential distribution, 1/cos h (x) or the like) is mainly used as f(x). Therefore, a probability density function that is based on a spherical distribution is expressed by formula (35) below. In the formula (35) below, h represents a constant for adjusting the outcome of the definite integration of all the arguments in the interval between −∞ and +∞. However, it disappears as it is abbreviated when determining a score function so that it is not necessary to determine its specific value. Note the derivative of f(x) is expressed as f'(x) in the following.

[Formula 18]

$$P(x)=hf(\|x\|) \tag{35}$$

The score function that corresponds to the probability density function with the expression (35) above can be determined by way of the process as described below. Function g(x) of formula (36) (where x represents a vector) as shown below is obtained by partially differentiating the logarithm of the probability density function by vector x. Then, $g(Y_k(t))$ obtained by substituting x in g(x) by $Y_k(t)$ includes the score functions of all the frequency bins. In other words, there is a relationship of $g(Y_k(t))=[\phi_{k1}(Y_k(t)), \ldots, \phi_{kM}(Y_k(t))]^T$. Therefore, score function $\phi_{k\omega}(Y_k(t))$ is obtained by extracting the elements of the ω-th row from $g(Y_k(t))$ as expressed by formula (37) below Note that it is not necessary to transform the above formula (33) because it can cope with inputs of complex numbers from the beginning because the absolute values of the elements are employed in the spherical distribution.

[FORMULA 19]

$$g(x)=\frac{f'(\|x\|)}{f(\|x\|)}\frac{x}{\|x\|} \tag{36}$$

$$\phi_{k\omega}(Y_k(t))=\omega-th \text{ row of } g(Y_k(t)) \tag{37}$$

As an example, (x) of f(x) will be replaced by a specific formula.

Assume that f(x) is expressed by a one-dimensional exponential distribution like formula (38) shown below. In the formula (38), K represents a constant that corresponds to the extent of distribution of scalar variable x but it may be equal to one, or K=1. Alternatively, the value of K may be made variable depending on the extent of distribution of L2 norm $\|Y_k(t)\|_2$ of $Y_k(t)$. A probability density function as expressed by formula (39) below is obtained by making the formula (38) multidimensional by means of a spherical distribution. Then, the corresponding $g(Y_k(t))$ is expressed by formula (40) below

[FORMULA 20]

$$f(x)=\exp(-|Kx|) \tag{38}$$

$$P_{Y_k}(Y_k(t))=h\exp(-K\|Y_k(t)\|_2) \tag{39}$$

$$g(Y_k(t))=-K\frac{Y_k(t)}{\|Y_k(t)\|_2} \tag{40}$$

Assume that f(x) is expressed by formula (41) below. In the formula (41), d is a positive value. A probability density function as expressed by formula (42) below is obtained by making the formula (41) multidimensional by means of a spherical distribution. Then, the corresponding $g(Y_k(t))$ is expressed by formula (43) below

[FORMULA 21]

$$f(x)=\frac{1}{\cosh^d(Kx)} \tag{41}$$

$$P_{Y_k}(Y_k(t))-\frac{h}{\cosh^d(K\|Y_k(t)\|_2)} \tag{42}$$

$$g(Y_k(t))=-dK\tanh(K\|Y_k(t)\|_2)\frac{Y_k(t)}{\|Y_k(t)\|_2} \tag{43}$$

(II) $L_N$ Norm

A multidimensional probability density function can be established on the basis of an $L_N$ norm by substituting an arbitrarily selected non-negative function f(x) (where x is a scalar) with the $L_N$ norm. An $L_N$ norm refers to the N-th power root of the total sum of the N-th powers of the absolute values of elements. A multidimensional probability density function such as formula (44) below is obtained by substituting the non-negative function f(x) with the $L_N$ norm $\|Y_k(t)\|_N$ of $Y_k(t)$ and making it multidimensional. In the formula (44) below, h represents a constant for adjusting the outcome of the definite integration of all the arguments in the interval between −∞ and +∞. However, it disappears as it is abbreviated when determining a score function so that it is not necessary to determine its specific value. The above-described spherical distribution corresponds to a case where N=2 is selected for the multidimensional probability density function established on the basis of the $L_N$ norm.

[Formula 22]

$$P_{Yk}(Y_k(t))=hf(\|Y_k(t)\|_N) \tag{44}$$

Formula (45) shown below can be drawn out from the above formula (44) as a score function that can cope with complex numbers.

[FORMULA 23]

$$\hat{\phi}_{k\omega}(Y_k(t))=\frac{f'(\|Y_k(t)\|_N)}{f(\|Y_k(t)\|_N)}\|Y_k(t)\|_N^{1-N}|Y_k(\omega,t)|^{N-2}Y_k(\omega,t) \tag{45}$$

If f(x) is expressed by formula (46) below that shows a one-dimensional exponential distribution, a score function as expressed by formula (47) below is drawn out from the above formula (45). If, on the other hand, f(x) is expressed by formula (48) below, a score function as expressed by formula (49) below is drawn out from the above formula (45). In the formulas (46) and (48), K represents a positive real number and d, m respectively represent natural numbers.

[FORMULA 24]

$$f(x)=\exp(-Kx^m)(K>0) \tag{46}$$

$$\hat{\phi}_{k\omega}(Y_k(t))=-Km\|Y_k(t)\|_N^{m-N}|Y_k(\omega,t)|^{N-2}Y_k(\omega,t) \tag{47}$$

$$f(x)=\frac{1}{\cosh^d(Kx^m)}(K,d,m>0) \tag{48}$$

$$\hat{\phi}_{k\omega}(Y_k(t))=dKm\tanh(K\|Y_k(t)\|_N^m)\|Y_k(t)\|_N^{m-N}|Y_k(\omega,t)|^{N-2}Y_k(\omega,t) \tag{49}$$

If N=2 and m=1 in the above formulas (47) and (49), a score function same as that of the above-described spherical distribution is obtained and the observation signals can be separated without giving rise to permutation as will be discussed hereinafter. Note, however, permutation arises as a result of separation when N=1 and m=1 in the above formulas (47) and (49). This is because the term of $\|Y_k(t)\|_N^{(m-N)}$ in the above formulas (47) and (49) disappears when N=m and the correlation among the frequency bins are not significantly reflected there. Additionally, a problem of division by nil arises in the computational operation when N≠m and $\|Y_k(t)\|_N=0$ and hence no signal exists in the t-th frame.

In view of these problems, the expression of the score function $\phi_{k\omega}(Y_k(t)$ is modified in this embodiment so as to meet the requirements that the return value represents a dimensionless number and that the phase of the return value is inverse to that of the ω-th argument.

That the return value of the score function $\phi_{k\omega}(Y_k(t)$ represents a dimensionless number [x], the unit of $Y_k(\omega, t)$ is [x], [x] is offset between the numerator and the denominator of the score function and the return value of the score function does not include the dimension of [x] (the unit that is described as [$x^n$] where n is a non-zero value).

That the phase of the return value is inverse to that of the ω-th argument is explained that that the equation $\arg\{\phi k\omega(Y_k(t))\}=-\arg\{Y_k(\omega, t)\}$ is satisfied for any $Y_k(\omega, t)$, where arg{z} represents the phase component of complex number z. For example, arg{z}=θ when z is expressed as $z=r\cdot\exp(i\theta)$, using magnitude r and a phase angle θ.

Note that $\Delta W(\omega)=\{In+Et[\ \ldots\ ]\}W(\omega)$ as shown in the above-described formulas (22) and (32) in this embodiment, the requirement to be met by the score function is that the phase of the return value is "inverse" relative to the ω-th phase. However, when $\Delta W(\omega)=\{In-Et[\ \ldots\ ]\}W(\omega)$, the sign of the score function is inverted so that the requirement to be met by the score function is that the phase of the return value is "same" as the ω-th phase. In either case, it is only necessary that the phase of the return value of the score function solely depends on the ω-th phase.

The above-described requirement is a generalized expression of the above formula (33) that the return value of the score function represents a dimensionless number and that its phase is inverse to the ω-th phase. Therefore, the measure to be taken for the above formula (33) for complex numbers is not necessary when the score function meets these requirements.

Now, the embodiment will be described by way of specific examples.

As described above, the above formulas (47) and (49) express score functions that are derived from a multidimensional probability density function that is established on the basis of an $L_N$ norm. These score functions meet the requirements that the return value represents a dimensionless number and that its phase is inverse to the ω-th phase. Therefore, it is possible to separate observation signals without giving rise to any permutation when N≠m. However, as pointed out above, the term of $\|Y_k(t)\|_N^{(m-N)}$disappears when N=m and hence permutation can take place in the outcome of separation. Additionally, a problem of division by nil arises in the computational operation when N≠m and $\|Y_k(t)\|_N=0$ and hence no signal exists in the t-th frame.

Thus, the above-described formulas (47) and (49) are modified so as to read as formulas (50) and (51) shown below in order to meet the requirements that the return value represents a dimensionless number and that its phase is inverse to the ω-th phase even when N=m and eliminate the problem of division by nil. In the formulas (50) and (51), L is a positive constant, which may typically be L=1, and a is a non-negative constant for preventing division by nil from taking place.

[FORMULA 25]

$$\phi_{k\omega}(Y_k(t)) = -K\left(\frac{|Y_k(\omega, t)|}{\|Y_k(t)\|_N + a}\right)^L \frac{Y_k(\omega, t)}{|Y_k(\omega, t)|} \tag{50}$$

$$(L > 0)$$

$$\phi_{k\omega}(Y_k(t)) = -dKm\tanh(K\|Y_k(t)\|_N^m)\left(\frac{|Y_k(\omega, t)|}{\|Y_k(t)\|_N + a}\right)^L \frac{Y_k(\omega, t)}{|Y_k(\omega, t)|} \tag{51}$$

In the above formulas (50) and (51), the term of $\|Y_k(t)\|_N$ remains without disappearance even when N=m. Additionally, no problem of division by nil arises when the term of $\|Y_k(t)\|_N=0$.

If the unit of $Y_k(\omega, t)$ is [x] in the above formulas (50) and (51), the quantity of [x] appears for the same number of times (L+1 times) in the numerator and the denominator so that they are offset by each other to make the score functions represent a dimensionless number as a whole (tan h is regarded as a dimensionless number). Additionally, since the phase of the return value of each of these formulas is equal to the phase of $-Y_k(\omega, t)$, the phase of the return value is inverse relative to the phase of $Y_k(\omega, t)$. Thus, the score functions expressed by the above formulas (50) and (51) meet the requirements that the return value represents a dimensionless number and that its phase is inverse to the ω-th phase.

When computing for the $L_N$ norm $\|Y_k(t)\|_N$ of $Y_k(t)$, it is necessary to determine the absolute value of a complex number. However, as shown in formulas (52) and (53) below, the absolute value of a complex number may be approximated by the absolute value of the real part or the imaginary part. Alternatively, as shown in formula (54) below, it may be approximated by the sum of the absolute value of the real part and that of the imaginary part.

$$|Y_k(\omega,t)|\approx|Re(Y_k(\omega,t)| \tag{52}$$

$$|Y_k(\omega,t)|\approx|Im(Y_k(\omega,t)| \tag{53)}$$

$$|Y_k(\omega,t)|\approx|Re(Y_k(\omega,t))|+|Im(Y_k(\omega,t))| \tag{54}$$

[Formula 26]

In a system where the real part and the imaginary part of a complex number are separated and held, the absolute value of complex number z that is expressed by z=x+iy (where x and y are real numbers and i is the unit of imaginary numbers) is computed in a manner as expressed by formula (55) below. On the other hand, the absolute value of the real part and that of the imaginary part are computed in a manner as expressed by formulas (56) and (57) respectively so that the quantity of computation is reduced. Particularly, in the case of an L1 norm, it is possible to compute only by using the absolute value of the real part and a sum without using a square and a root so that the computations can be very simplified.

[Formula 27]

$$|z|=\sqrt{x^2+y^2} \tag{55}$$

$$|Re(z)|=|x| \tag{56}$$

$$|Im(z)|=|y| \tag{57}$$

Furthermore, since the value of an $L_N$ norm is substantially determined by components having a large absolute value in $Y_k(t)$, the $L_N$ norm may be computed only by using the components of top x percent in terms of absolute value instead of using all the components of $Y_k(t)$. The higher order x % can be determined in advance from the spectrograms of the observation signals.

(III) Elliptical Distribution

An elliptical distribution refers to a multidimensional probability density function that is produced by substituting an arbitrarily selected non-negative function f(x) (where x is a scalar) with the Mahalanobis distance sqrt($x^T\Sigma^{-1}x$) of the column vector x as shown by formula (58) below A multidimensional probability density function as expressed by formula (59) below is obtained by substituting the non-negative function f(x) with $Y_k(t)$ and making it multidimensional. In the formula (59), $\Sigma_k$ represents the variance/covariance matrix of $Y_k(t)$.

[FORMULA 28]

$$P(x) = hf\left(\sqrt{x^T\Sigma^{-1}x}\right) \tag{58}$$

$$P_{Yk}(Y_k(t)) = hf\left(\sqrt{Y_k(t)^H\Sigma_k^{-1}Y_k(t)}\right) \tag{59}$$

where, $$\Sigma_k = E_t[Y_k(t)Y_k(t)^H] = \frac{1}{T-1}Y_kY_k^H$$

Formula (60) as shown below is obtained when a score function is derived from the above formula (59). In the formula (60), (·)ω indicates extraction of the vector and the ω-th row of the matrix in the parenthesis. In the case of an elliptical distribution, the Mahalanobis distance takes only a non-negative real number if the elements of $Y_k(t)$ include a complex number and hence the measure to be taken for the above formula (33) for complex numbers is not necessary.

[FORMULA 29]

$$\phi_{k\omega}(Y_k(t)) = \frac{f'\left(\sqrt{Y_k(t)^H\Sigma_k^{-1}Y_k(t)}\right)}{f\left(\sqrt{Y_k(t)^H\Sigma_k^{-1}Y_k(t)}\right)}\frac{(\Sigma_k^{-1}Y_k(t))_\omega}{\sqrt{Y_k(t)^H\Sigma_k^{-1}Y_k(t)}} \tag{60}$$

If f(x) is expressed by formula (61) below in the above-described formula (60), a score function as expressed by formula (62) below is led out. In the formula (61), K represents a positive real number and d and m respectively represent natural numbers.

[FORMULA 30]

$$f(x) = \frac{1}{\cosh^d(Kx)}(d, K > 0) \tag{61}$$

$$\phi_{k\omega}(Y_k(t)) = -dK\tanh\left(K\sqrt{Y_k(t)^H\Sigma_k^{-1}Y_k(t)}\right)\frac{(\Sigma_k^{-1}Y_k(t))_\omega}{\sqrt{Y_k(t)^H\Sigma_k^{-1}Y_k(t)}} \tag{62}$$

However, when it is attempted to separate a signal by means of the above formula (62), the values of some of the elements overflow as the operation of updating the separation matrix W is repeated. This is because if an updating operation of W←αW (α>1) (the new W being scalar times of the immediately preceding W) takes place once, all the subsequent Ws are mere similar extensions and can eventually exceeds the limit of value that a computer can handle.

In view of this problem, the expression of the score function $\phi_{k\omega}(Y_k(t))$ is modified so as to meet the requirements that the return value represents a dimensionless number and that its phase is inverse to the ω-th phase.

It will be appreciated that the score function expressed by the formula (62) above does not meet the requirements that the return value represents a dimensionless number and that its phase is inverse to the ω-th phase. In other words, if the unit of $Y_k(w, t)$ is [x], the unit of the variance/covariance matrix $\Sigma_k$ is [$x^2$] so that the score function has dimensions of [1/x] as a whole. Additionally, in the computational operation of $(\Sigma_k^{-1}Y_k(t))\omega$ that appears in the numerator, the components other than $Y_k(\omega, t)$ in $Y_k(t)$ are added so that the phase of the return value will be different from $-Y_k(\omega, t)$.

Therefore, the above formula (62) is modified to formula (63) below in order to meet the requirements that the return value represents a dimensionless number and that its phase is inverse to ω-th phase. In the formula (63), L is a positive constant, which may typically be L=1, and a is a non-negative constant for preventing division by nil from taking place.

[FORMULA 31]

$$\phi_{k\omega}(Y_k(t)) = \frac{f'\left(\sqrt{Y_k(t)^H\Sigma_k^{-1}Y_k(t)}\right)}{f\left(\sqrt{Y_k(t)^H\Sigma_k^{-1}Y_k(t)}\right)}\left(\frac{|Y_k(\omega, t)|}{\|Y_k(t)\|_N + a}\right)^L\frac{Y_k(\omega, t)}{|Y_k(\omega, t)|} \tag{63}$$

Particularly, when f(x) is expressed by the above formula (61) and L=1, the score function that is led out is expressed by formula (64) below.

[FORMULA 32]

$$\phi_{k\omega}(Y_k(t)) = -dK\tanh\left(K\sqrt{Y_k(t)^H\Sigma_k^{-1}Y_k(t)}\right)\frac{Y_k(\omega, t)}{\|Y_k(t)\|_N + a} \tag{64}$$

An inverse matrix of the variance/covariance matrix $\Sigma_k$ may not exist depending of the distribution of $Y_k(t)$. Therefore, diag($\Sigma_k$) (a matrix formed by the diagonal elements of $\Sigma_k$) may be used in place of $\Sigma_k$ and a general inverse matrix (e.g., a Moore-Penrose type general inverse matrix) may be used in place of the inverse matrix $\Sigma_k^{-1}$.

(IV) Copula Model

According to the theorem of Sklar, an arbitrarily selected multidimensional cumulative distribution function $F(x_1, \ldots, x_d)$ is transformed to the right side of formula (65) shown below by using a d argument function $C(x_1, \ldots, x_d)$ having certain properties and marginal distribution functions $F_x(x_k)$ of each argument. The $C(x_1, \ldots, x_d)$ is referred to as copula. In other words, it is possible to establish various multidimensional cumulative distribution functions by combining the copula $C(x_1, \ldots, x_d)$ and the marginal distribution functions $F_k(x_k)$. Copulas are described, inter alia, in documents such as ["COPULAS" (http://gompertz.math.ualberta.ca/copula.pdf)"], ["The Shape of Neural Dependence" (http://wavelet.psych.wisc.edu/Jenison_Reale_Copula.pdf)] and ["Estimation and Model Selection of Semiparametric Copula-Based Multivariate Dynamic Models Under Copula Misspecification" (http://www.nd.edu/~meg/MEG2004/Chen-Xiaohong.pdf)].

$$F(x_1, \ldots, x_d) = C(F_1(x_1), \ldots, F_d(x_d)) \tag{65}$$

[Formula 33]

Now, a method of establishing a multidimensional probability density function by using a copula and a formula for updating a separation matrix W will be described below.

A probability density function as expressed by formula (66) below is obtained by partially differentiating the above formula (65) of cumulative distribution function (CDF) by means of all the arguments. In the formula (66), $P_j(x_j)$ represents a probability density function of argument $x_j$ and c' represents the outcome of partial differentiations of the copula by means of all the arguments.

[FORMULA 34]

$$\begin{aligned} P(x_1, \ldots, x_d) &= \frac{\partial}{\partial x_1} \cdots \frac{\partial}{\partial x_d} F(x_1, \ldots, x_d) \\ &= c'(F_1(x_1), \ldots, F_d(x_d)) \prod_{j=1}^{d} P_j(x_j) \end{aligned} \tag{66}$$

where, $$c'(x_1, \ldots, x_d) = \frac{\partial}{\partial x_1} \cdots \frac{\partial}{\partial x_d} C(x_1, \ldots, x_d)$$

A score function as expressed by formula (67) below is obtained by partially differentiating the logarithm of the probability density function by means of the ω-th argument. It is a general expression for multidimensional score functions, using a copula. In the formula (67), $F_{Yk}(\omega)(\cdot)$ represents the cumulative distribution function of $Y_k(\omega, t)$ and $P_{Yk}(\omega)(\cdot)$ represents the probability density function of $Y_k(\omega, t)$. Various multidimensional score functions can be established by substituting $c'(\cdot)$ $F_{Yk}(\omega)(\cdot)$ and $P_{Yk}(\omega)(\cdot)$ in the formula (67) by specific formulas.

[FORMULA 35]

$$\begin{aligned} \phi_{k\omega}(Y_k, (t)) &= \frac{\partial}{\partial Y_k(\omega, t)} \log P(Y_k(t)) \\ &= \frac{\frac{\partial}{\partial F_{Y_k(\omega)}(Y_k(\omega, t))} c'(F_{Y_k(1)}(Y_k(1, t)), \ldots, F_{Y_k(M)}(Y_k(M, t)))}{c'(F_{Y_k(1)}(Y_k(1, t)), \ldots, F_{Y_k(M)}(Y_k(M, t)))} \\ &\quad P_{Y_k(\omega)}(Y_k(\omega, t)) + \frac{\frac{\partial}{\partial Y_k(\omega, t)} P_{Y_k(\omega)}(Y_k(\omega, t))}{P_{Y_k(\omega)}(Y_k(\omega, t))} \end{aligned} \tag{67}$$

where, $$F_{Y_k(\omega)}(x) = \int_{-\infty}^{x} P_{Y_k(\omega)}(x)\,dx$$

$$P_{Y_k(\omega)}(x) = \frac{\partial}{\partial x} F_{Y_k(\omega)}(x)$$

For example, a type of copula expressed by formula (68) below, which is Clayton's copula, is known. In the formula (68), α is a parameter that shows the dependency among arguments. Formula (69) shown below is obtained by partially differentiating the formula (68) by means of all the arguments and formula (70) shown below, which is a score function, is obtained by substituting the above-described formula (67) with it. Actually, a score function that can cope with complex numbers is obtained by applying the above-described formula (33).

[FORMULA 36]

$$C(x_1, \ldots, x_d) = \frac{1}{\left(\sum_{j=1}^{d} x_j^{-\alpha} - d + 1\right)^{\frac{1}{\alpha}}} \tag{68}$$

$$c'(x_1, \ldots, x_d) = \frac{\prod_{j=1}^{d} \frac{1 + (j-1)\alpha}{x_j^{\alpha+1}}}{\left(\sum_{j=1}^{d} x_j^{-\alpha} - d + 1\right)^{\frac{1}{\alpha}+d}} \tag{69}$$

$$\begin{aligned} \phi_{k\omega}(Y_k(t)) &= \frac{P_{Y_k(\omega)}(Y_k(\omega, t))}{F_{Y_k(\omega)}(Y_k(\omega, t))} \\ &\left\{ \alpha + 1 - \frac{1 + \alpha M}{F_{Y_k(\omega)}(Y_k(\omega, t))^{\alpha}} \frac{1}{\sum_{j=1}^{M} F_{Y_k(j)}(Y_k(j, t))^{-\alpha} - M + 1} \right\} - \\ &\qquad \frac{\frac{\partial}{\partial Y_k(\omega, t)} P_{Y_k(\omega)}(Y_k(\omega, t))}{P_{Y_k(\omega)}(Y_k(\omega, t))} \end{aligned} \tag{70}$$

Examples of formula obtained by substituting $F_{Yk}(\omega)(\cdot)$ and $P_{Yk}(\omega)(\cdot)$ with specific expressions are shown below.

Assume that the distribution of each frequency bin is an exponential distribution. Then, a probability density function can be expressed by formula (71) below. In the formula (71), K is a variable that corresponds to the extent of distribution but may be made equal to one, or K=1. The cumulative distribution function of an exponential distribution can be expressed by formula (72) below. Because of the measure taken by the above-described formula (33) to deal with complex numbers, the argument of the formula (72) may be defined to be non-negative. Formula (73) below, which is a score function, is obtained by substituting related elements of the above formula (70) with the formulas (71) and (72).

[FORMULA 37]

$$P_{Y_k(\omega)}(x) = \frac{K}{2} \exp(-|Kx|) \tag{71}$$

$$F_{Y_k(\omega)}(x) = 1 - \frac{1}{2} \exp(-Kx) \text{ (when } x \geq 0) \tag{72}$$

-continued $$\phi_{k\omega}(Y_k(t)) = \frac{\frac{K}{2}\exp(-KY_k(\omega,t))}{1-\frac{1}{2}\exp(-KY_k(\omega,t))}\left\{\alpha+1-\frac{1+\alpha M}{\left(1-\frac{1}{2}\exp(-KY_k(\omega,t))\right)^{\alpha}}\frac{1}{\sum_{j=1}^{M}\left(1-\frac{1}{2}\exp(-KY_k(j,t))\right)^{-\alpha}-M+1}\right\}+K \quad (73)$$

Unlike score functions using a spherical distribution, an $L_N$ norm or an elliptical distribution, it is possible to apply different distributions to different frequency bins in a score function using a copula. For example, it is possible to use a probability density function and a cumulative distribution function in a switched manner depending on if the signal distribution in a frequency bin is super-gaussian or sub-gaussian. This corresponds to using $-[Y_k(\omega, t)+\tanh\{Y_k(\omega, t)\}]$ and $-[Y_k(\omega, t)-\tanh\{Y_k(\omega, t)\}]$ in a switched manner for a score function with the above-described extended infomax method.

More specifically, an exponential distribution expressed by formula (74) shown below is provided as probability density function and formula (75) shown below is provided as cumulative distribution function for super-gaussian distributions. On the other hand, formula (76) shown below is provided as probability density function and formula (77) shown below, which is referred to as Williams approximation, is provided as cumulative distribution function for sub-gaussian distributions. Thus, the formulas (74) and (76) are used when the distribution of a frequency bin is super-gaussian, whereas the formulas (75) and (77) are used when the distribution of a frequency bin is sub-gaussian.

[FORMULA 38]

$$P_{Y_k(\omega)}(x) = \begin{cases} \frac{K}{2}\exp(-|Kx|) & (\text{when } \kappa_4 \geq 0) \quad (74) \\ \frac{K}{2}\frac{x\exp(-Kx^2)}{\sqrt{1-\exp(-Kx^2)}} & (\text{when } \kappa_4 < 0) \quad (75) \end{cases}$$

$$F_{Y_k(\omega)}(x) = \begin{cases} 1-\frac{1}{2}\exp(-Kx) & (\text{when } \kappa_4 \geq 0) \quad (76) \\ \frac{1}{2}+\frac{1}{2}\sqrt{1-\exp(-Kx^2)} & (\text{when } \kappa_4 < 0) \quad (77) \end{cases}$$

where, $$\kappa_4 = E_t[|Y_k(\omega,t)|^4] - 3E_t[|Y_k(\omega,t)|^2]^2$$

(D) Modified Examples

While the formula of the score function is modified so as to meet the requirements that the return value represents a dimensionless number and that its phase is inverse to the ω-th phase after leading out a score function on the basis of an $L_N$ norm or an elliptical distribution in (c) (ii) and (iii) above, a score function that meets the two requirements may directly be established.

Formula (78) shown below expresses a score function that is established in this way. In the formula (78), g(x) is a function that meets the requirements i) through iv) listed below.

i) g(x)≦0 for x≦0.

ii) g(x) is a constant, a monotone increasing function or a monotone decreasing function for x≦0.

iii) g(x) converges to a position value for x←∞ when g(x) is a monotone increasing function or a monotone decreasing function.

iv) g(x) is a dimensionless number for x.

[FORMULA 39] (78)

$$\phi_{k\omega}(Y_k(t)) = -mg(K\|Y_k(t)\|_N)\left(\frac{|Y_k(\omega,t)|+a_2}{\|Y_k(t)\|_N+a_1}\right)^L \frac{Y_k(\omega,t)}{|Y_k(\omega,t)|+a_3}$$

$$(m > 0,\ L,\ a_1,\ a_2,\ a_3 \geq 0)$$

Formulas (79) through (83) are examples of g(x) that can successfully be used for separation of observation signals. In the formulas (79) through (83), the constant terms are defined so as to meet the above requirements of i) through iii).

[FORMULA 40]

$$g(x) = b \pm \tanh(Kx) \quad (79)$$

$$g(x) = 1 \quad (80)$$

$$g(x) = \frac{x+b_2}{x+b_1}(b_1, b_2 \geq 0) \quad (81)$$

$$g(x) = 1 \pm h\exp(-Kx)(0 < h < 1) \quad (82)$$

$$g(x) = b \pm \arctan(Kx) \quad (83)$$

Formula (84) below expresses a more generalized score function. The score function is a function expressed as a product of multiplication of function $f(Y_k(t))$ where vector $Y_k(t)$ represents arguments, function $g(Y_k(\omega, t))$ where scalar $Y_k(\omega, t)$ represents arguments and term $-Y_k(\omega, t)$ for determining the phase of the return value. Note that $f(Y_k(t))$ and $g(Y_k(\omega, t))$ are so defined that the their product of multiplication meets the requirements of v) and vi) listed below for any $Y_k(t)$ and $Y_k(\omega, t)$.

v) $f(Y_k(t))$ and $g(Y_k(\omega, t))$ are non-negative real numbers.

vi) the dimensions of $f(Y_k(t))$ and $g(Y_k(\omega, t))$ are [1/x] (where x is the unit of $Y_k(\omega, t)$).

[Formula 41]

$$\phi_{k\omega}(Y_k(t)) = -f(Y_k(t))g(Y_k(\omega,t))Y_k(\omega,t) \quad (84)$$

Due to the requirement v) above, the phase of the score function is same with $-Y_k(\omega, t)$ so that the requirement that the phase of the return value of the score function is inverse relative to the ω-th phase. Additionally, the dimensions are offset by $Y_k(\omega, t)$ due to the requirement of vi) so that the requirement that the score function represents a dimensionless number is satisfied.

Specific formulas of multidimensional probability density function and score function are described above. Now, the specific configuration of an audio signal separation apparatus of this embodiment will be described below.

Figure 13:
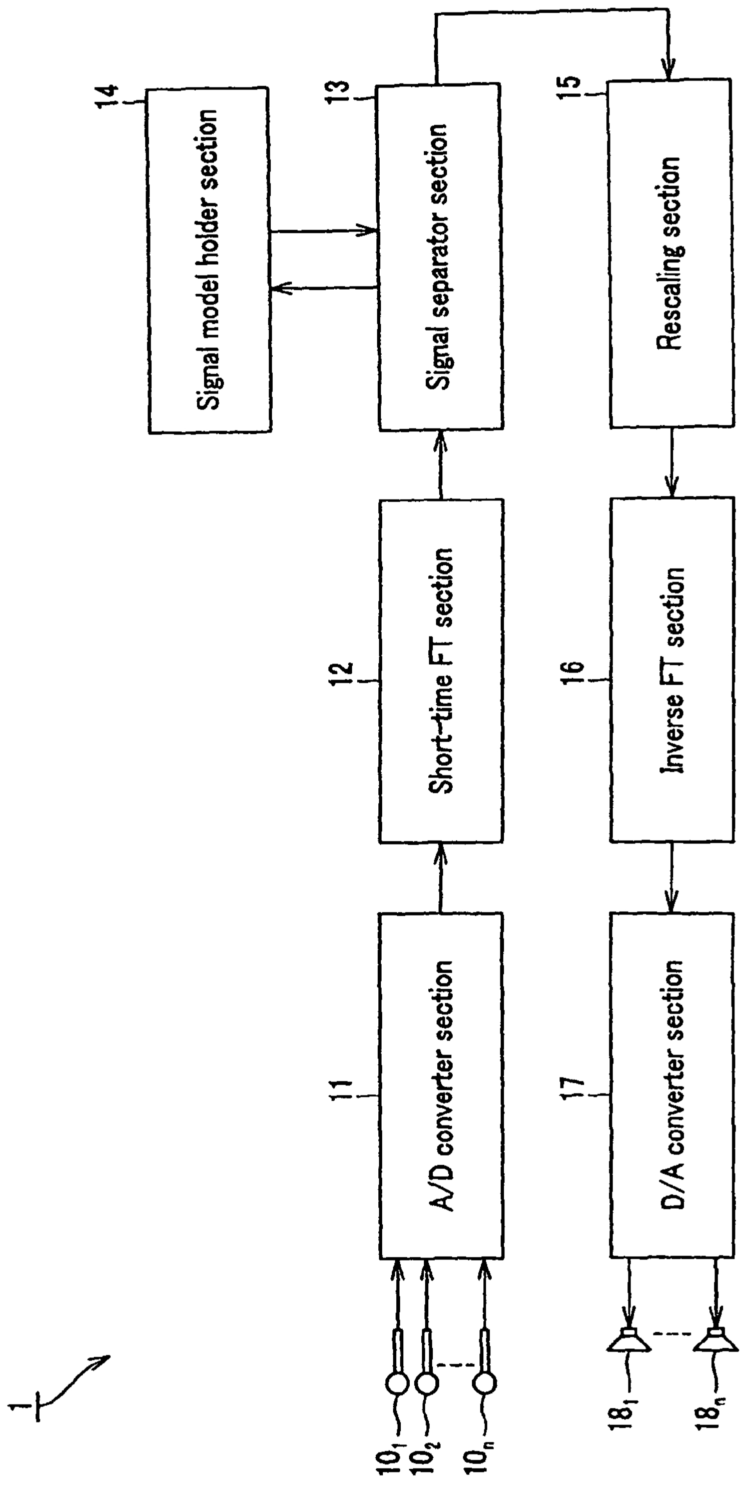
FIG. 13 is a schematic block diagram of an embodiment of audio signal separation apparatus according to the invention.

FIG. 13 is a schematic block diagram of the embodiment of audio signal separation apparatus according to the invention. In the audio signal separation apparatus 1, n microphones $\mathbf{10}_1$ through $\mathbf{10}_n$ are adapted to observe the independent sounds emitted from n audio sources and an A/D (analog/digital) converter section 11 performs A/D conversions on the signals of the independent sounds to obtain observation signals. A short-time Fourier transformation section 12 performs a short-time Fourier transformation on the observation signals to generate spectrograms of the observation signals. A signal separator section 13 separates the spectrograms of the observation signal into spectrograms that are based on independent signals by utilizing signal models held in a signal model holder section 14. A signal model refers to a multidimensional probability density function as described above and is used to computationally determine the entropy of each isolated signal in the separation process. Note, however, that it is not necessary for the signal model holder section 14 to hold multidimensional probability density functions and it is sufficient for it to hold score functions obtained by partially differentiating the logarithms of the probability density function by means of arguments.

A rescaling section 15 operates to provide a unified scale to each frequency bin of the spectrograms of the isolated signals. If a normalization process (averaging and/or variance adjusting process) has been executed on the observation signals before the separation process, it operates to undo the process. An inverse Fourier transformation section 16 transforms the spectrograms of the isolated signals into isolated signals in the time domain by means of inverse Fourier transformation. A D/A converter section 17 performs D/A conversions on the isolated signals in the time domain and n speakers $\mathbf{18}_1$ through $\mathbf{18}_n$ reproduce sounds independently.

While the audio signal separation apparatus 1 is adapted to reproduce sounds by means of n speakers $\mathbf{18}_1$ through $\mathbf{18}_n$ it is also possible to output the isolated signals so as to be used for speech recognition or for some other purpose. Then, if appropriate, the inverse Fourier transformation may be omitted.

Figure 14:
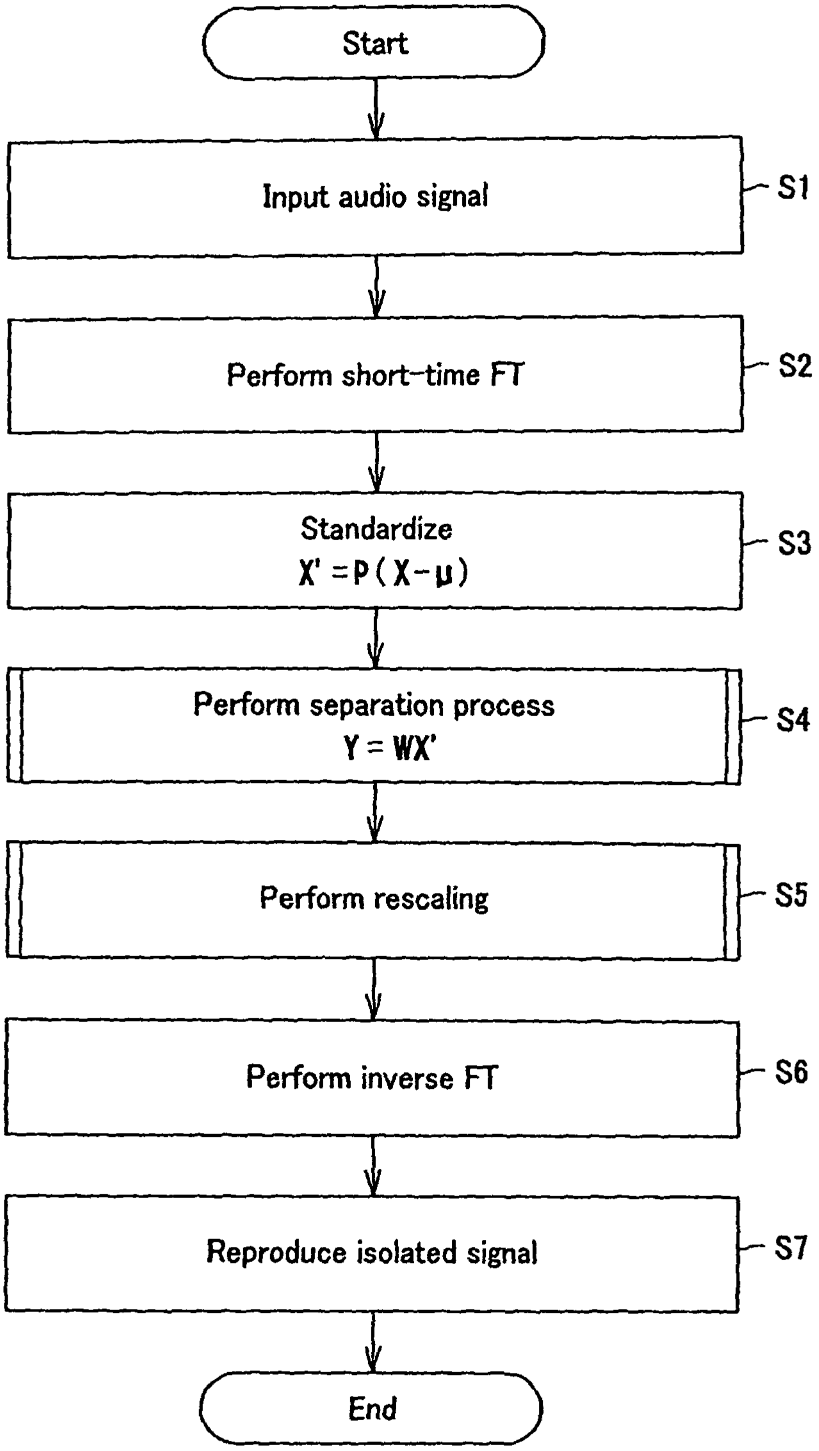
FIG. 14 is a flowchart of the processing operation of the embodiment of audio signal separation apparatus, summarily illustrating the operation.

Now, the processing operation of the audio signal separation apparatus will summarily be described below by referring to the flowchart of FIG. 14. Firstly, in Step S1, the apparatus observes the audio signals by way of the microphones and, in Step S2, performs a short-time Fourier transformation on the observation signals to obtain spectrograms. Then, in the next step, or Step S3, the apparatus standardizes the spectrograms of the observation signals for the frequency bins of each channel. The normalization is an operation of making the average and the standard deviation of the frequency bins respectively equal to 0 and 1. The average can be made equal to 0 by subtraction of the average value of each frequency bin and the standard deviation can be made equal to 1 by division of the average value by the standard deviation. When a spherical distribution is used as multidimensional probability density function, it is also possible to use some other technique for the purpose of standardization. More specifically, after making the average of each frequency bin equal to 0, the standard deviation is determined in $1 \leqq t \leqq T$ of the vector norm $\|Y_k(t)\|$ and $Y_k$, is divided by the determined value for standardization. If the observation signals after normalization are expressed by X', all the standardizations can be expressed by $X'=P(X-\mu)$, where P represents the diagonal matrix of the reciprocals of the standard deviations and $\mu$ represents the vector of the average value of each frequency bin.

In the next step, or Step S4, a separation process is executed on the standardized observation signals. More specifically, a separation matrix W and isolated signals Y are determined. The processing operation of Step S4 will be described in greater detail hereinafter. While the isolated signals Y obtained in Step S4 are free from permutation, they show different scales for frequency bins. Therefore, a rescaling operation is conducted in Step S5 to unify the scales to provide a unified scale to each frequency bin. The operation of restoring the average and the standard deviation that are modified in the normalization process is also conducted here. The processing operation of Step S5 will also be described in greater detail hereinafter. Then, subsequent to the rescaling operation, the isolated signals are transformed into isolated signal in the time domain by means of inverse Fourier transformation in Step S6 and reproduced from the speakers in Step S7.

Figure 15:
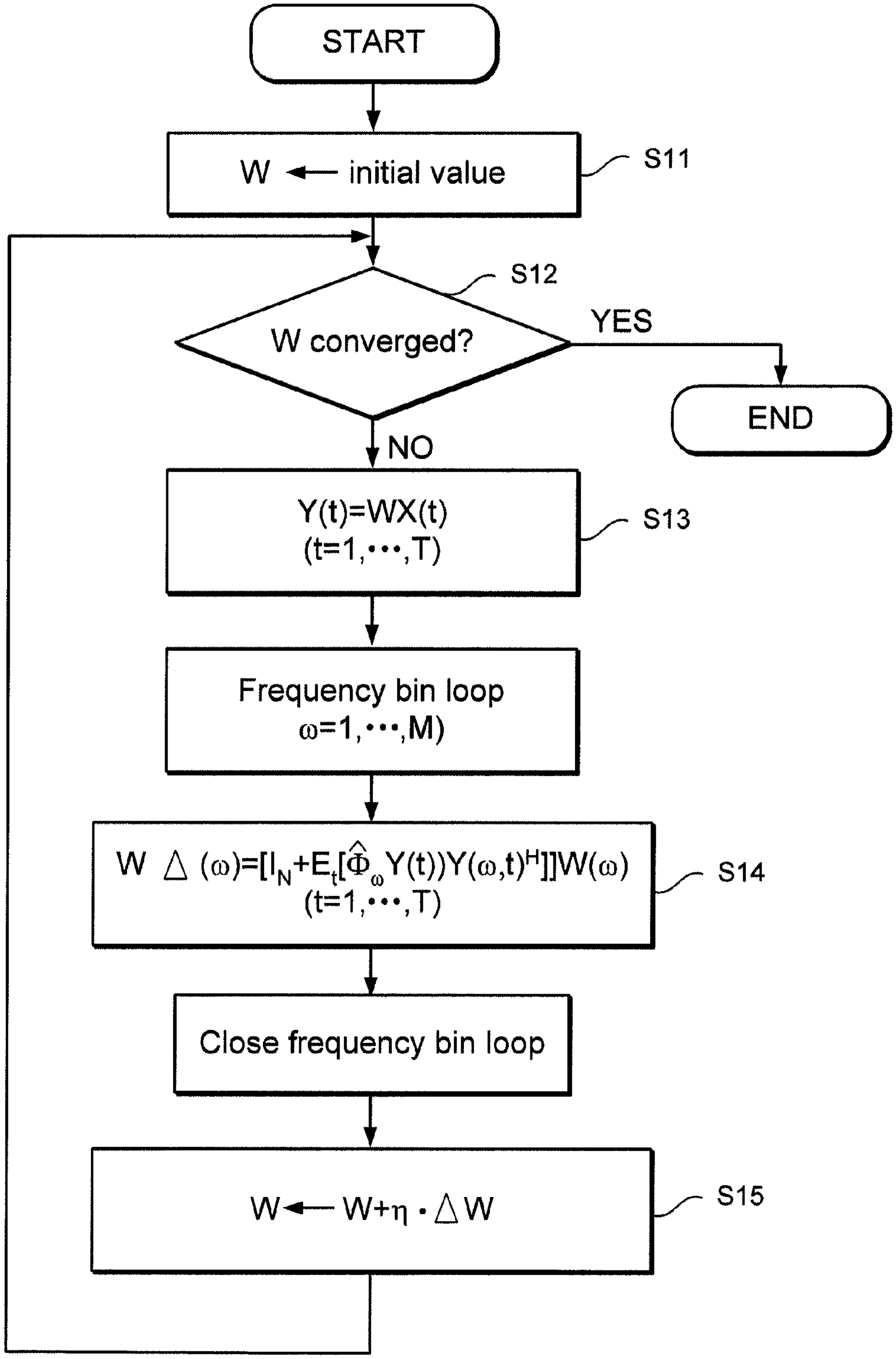
FIG. 15 is a flowchart of the processing operation of the embodiment of audio signal separation apparatus, illustrating in detail the operation when it is conducted for a batch process.
Figure 16:
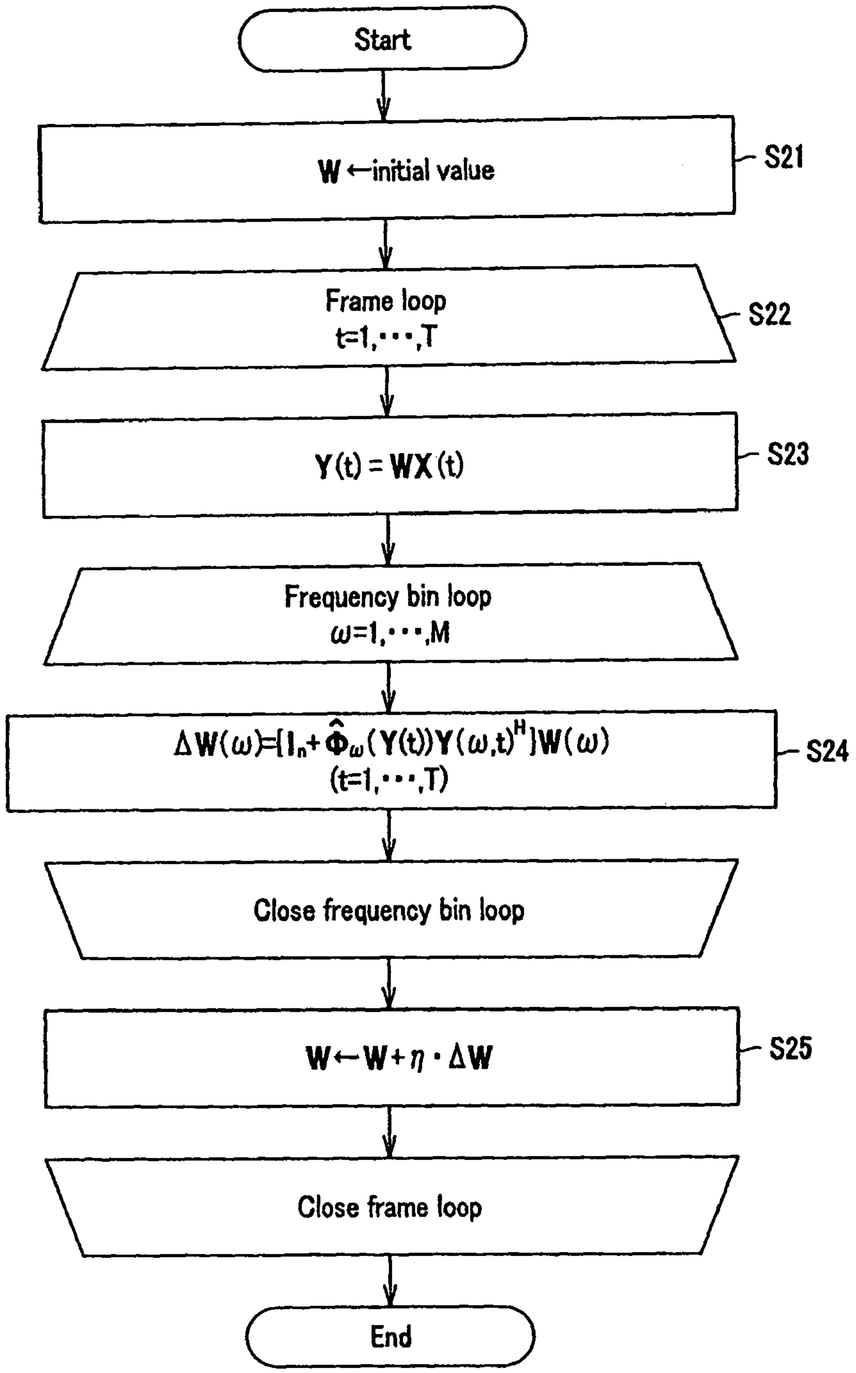
FIG. 16 is a flowchart of the processing operation of the embodiment of audio signal separation apparatus, illustrating in detail the operation when it is conducted for an online process.

The separation process of Step S4 (in FIG. 14) will be described in greater detail by referring to FIGS. 15 and 16. FIG. 15 shows a flowchart for a batch process whereas FIG. 16 shows a flowchart for an online process. All the signals are collectively processed in a batch process, whereas each sample (a frame in the independent component analysis in the time-frequency domain) is processed when it is input on a sequential basis. Note that X(t) in FIGS. 15 and 16 represents standardized signals and corresponds to X'(t) in FIG. 14.

Firstly, the separation process will be described in terms of batch process by referring to FIG. 15. To begin with, in Step S11, the separation matrix W is substituted by an initial value. It may be substituted by a unit matrix or all the W(ω) of the above-described formula (21) may be substituted by a common matrix. In the next step, or Step S12, it is determined if W converges or not and the process is terminated if it converges but made to proceed to Step S13 if it does not converge.

In the next step, or Step S13, the isolated signals Y at the current time are computationally determined and, in Step S14, ΔW is computationally determined according to the above-described formula (32). Since ΔW is computed for each frequency bin, the loop of ω to is followed and the above formula (32) is applied to each ω. After determining ΔW, W is updated in Step S15 and the processing operation returns to Step S12.

Figure 6:
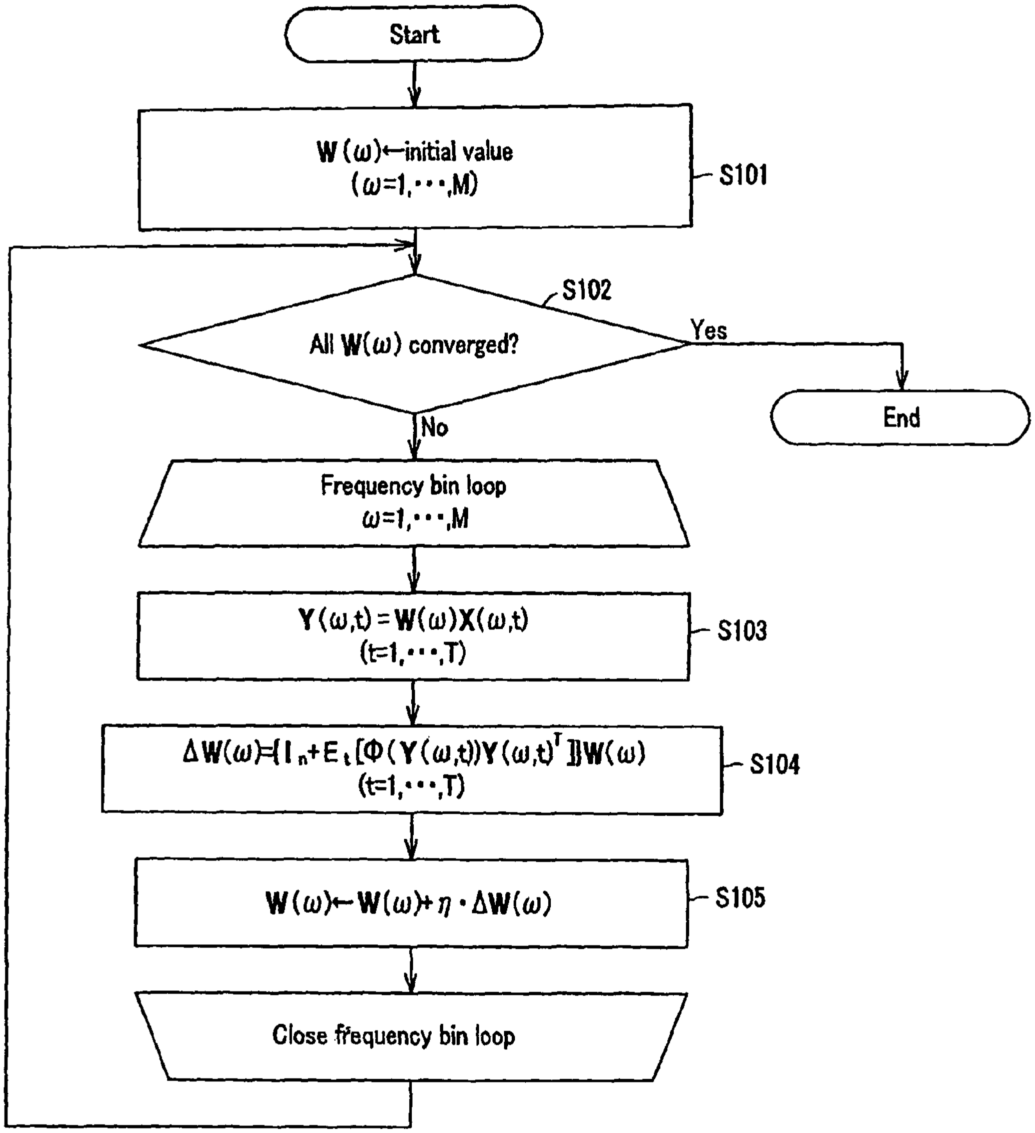
FIG. 6 is a flowchart of the prior art separation process.

While the outside of the frequency bin loop is assumed in Steps S13 and S15 in FIG. 15, the processing operations in these steps may be moved to the inside of the frequency bin loop and the computational operations of Steps S103 and S105 in FIG. 6, which is described earlier, may alternatively be used. While the processing operation of updating W is conducted until W converges in FIG. 15, it may alternatively be repeated for a predetermined number of times that is sufficiently large.

Now, the separation process will be described in terms of online process by referring to FIG. 16. It differs from the separation process on a batch process basis in that ΔW is computationally determined each time a sample is given and the averaging operation Et[·] is eliminated from the formula for updating ΔW. More specifically, to begin with, in Step S21, the separation matrix W is substituted by an initial value. In the next step, or Step S22, it is determined if W converges or not and the process is terminated if it converges but made to proceed to Step S23 if it does not converge.

In the next step, or Step S23, the isolated signals Y at the current time are computationally determined and, in Step S24, ΔW is computationally determined. As pointed out above, the averaging operation Et[·] is eliminated from the formula for updating ΔW. After determining ΔW, W is updated in Step S25. The processing operations from Step S22 to Step S25 are repeated for all the frames, following the loop of ω for each frame.

Note that η in Step S24 may have a fixed value (e.g., 0.1). Alternatively, it may be so adjusted as to become smaller as the frame number t increases. If it is adjusted to become smaller with the increase of the frame number, preferably the rate of convergence of W is raised by selecting a large value (e.g., 1) for η for smaller frame numbers but a small value is selected for η for larger frame numbers in order to prevent abrupt fluctuations in the isolated signals.

Figure 17:
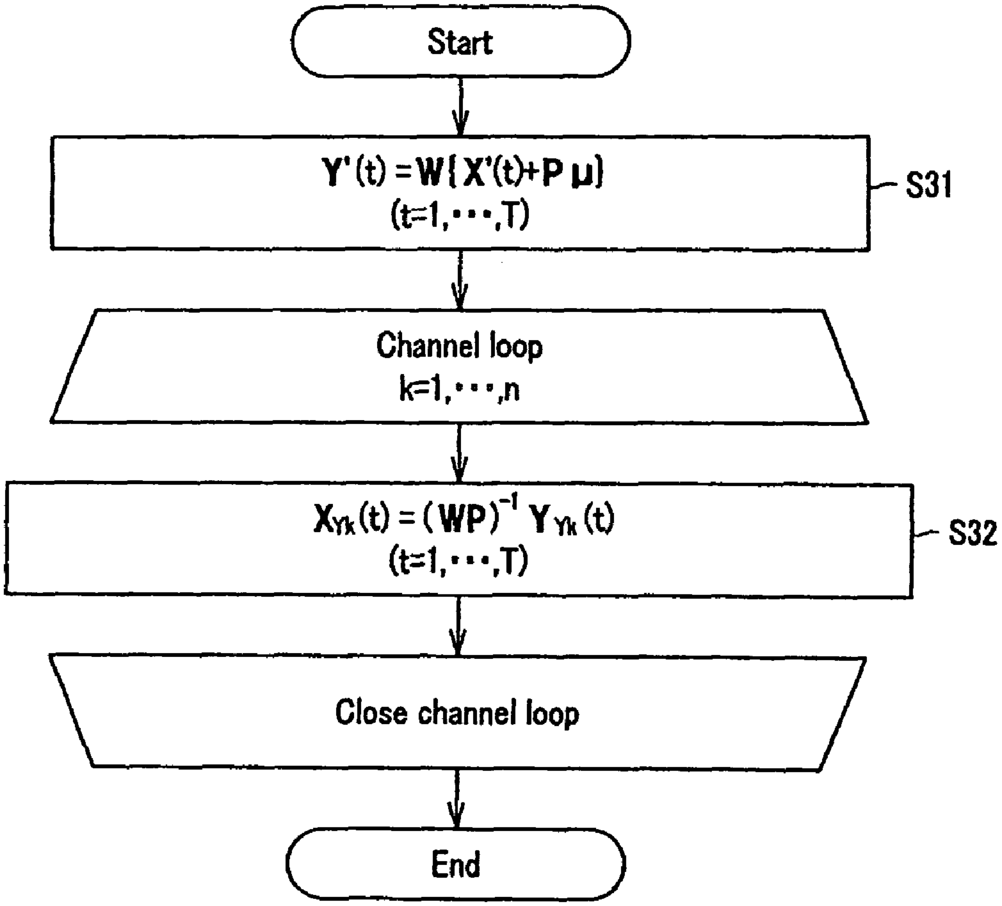
FIG. 17 is a flowchart of the processing operation of the embodiment of audio signal separation apparatus, illustrating in detail the operation when it is conducted for a resealing process.

Now, the above-described rescaling process in Step S5 (FIG. 14) will be described further by referring to FIG. 17. Conventionally, the rescaling process is conducted for each frequency bin. However, in this embodiment, a rescaling operation is conducted for all the frequency bins by using W, X, Y and the like in the above-described formula (13).

The separation matrix W is determined at the time when the separation process of Step S4 (FIG. 14) is completed. Therefore, in Step S31, W is multiplied by the observation signals X'(t) to obtain isolated signals Y'(t). P in Step S31 represents a variance normalization matrix. Pμ is added to X'(t) in order to restore the original observation signals, of which the average is made equal to 0 in Step S3 (FIG. 14). The scaling problem is not dissolved at this stage.

In the next step, or Step S32, the scaling problem is dissolved by estimating the observation signal of each audio source from the isolated signals. Now, the principle of the operation will be described below.

Figure 1:
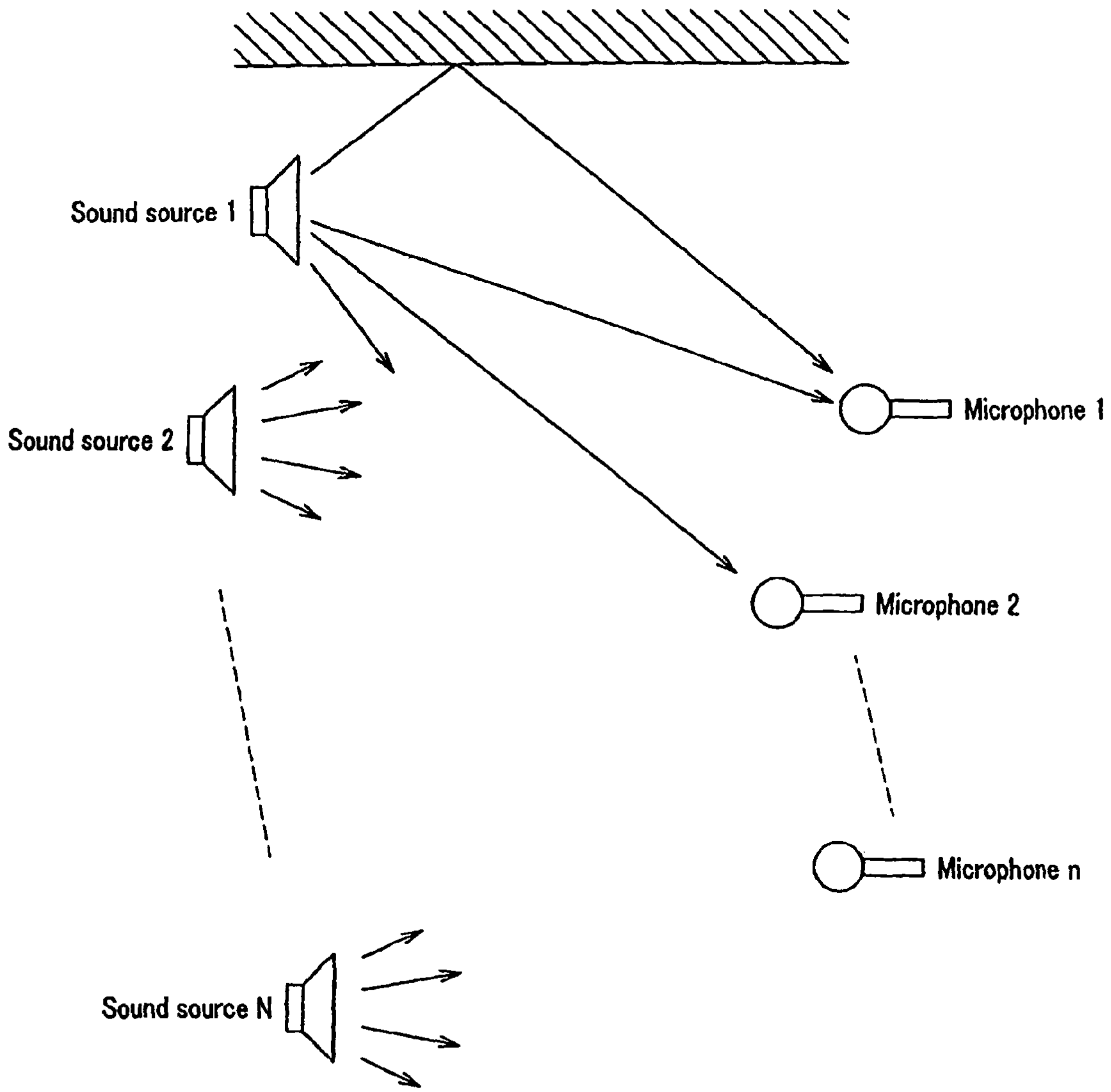
FIG. 1 is a schematic illustration of a situation where the original signals output from N audio sources are observed by means of n microphones.
Figure 2:
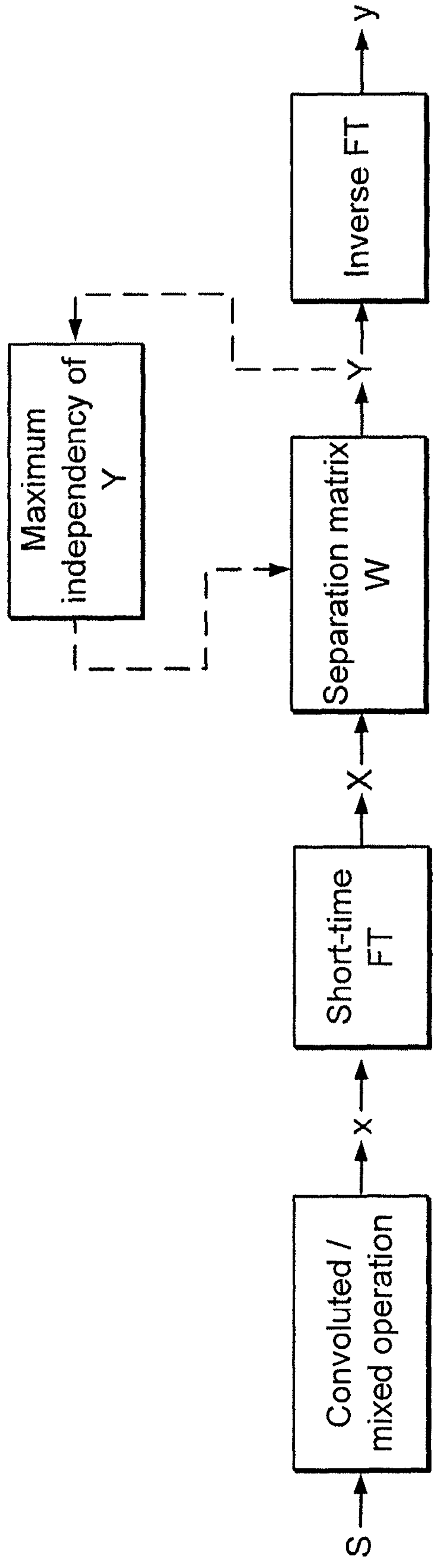
FIG. 2 RELATED ART
FIG. 2 is a schematic illustration of the prior art independent component analysis in the time-frequency domain.
Figure 3A:
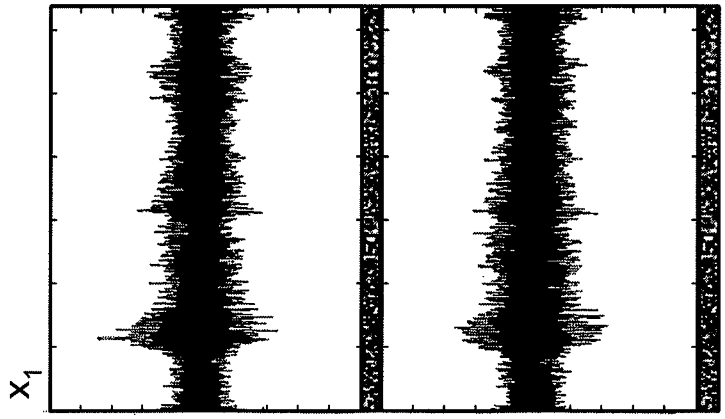
FIGS. 3A through 3D are schematic illustrations of observation signals, their spectrograms, isolated signals and their spectrograms.
Figure 3B:
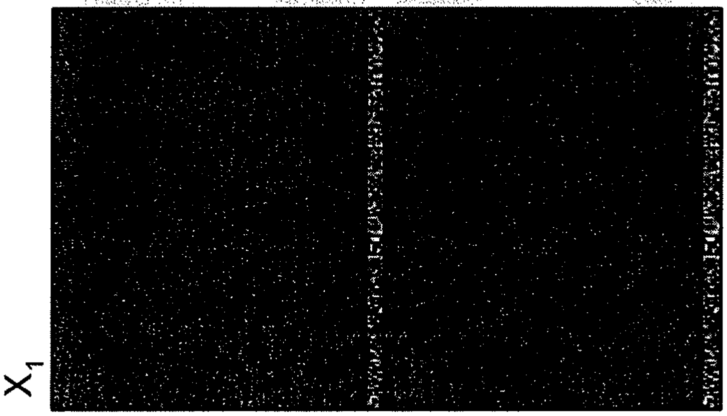
Figure 3C:
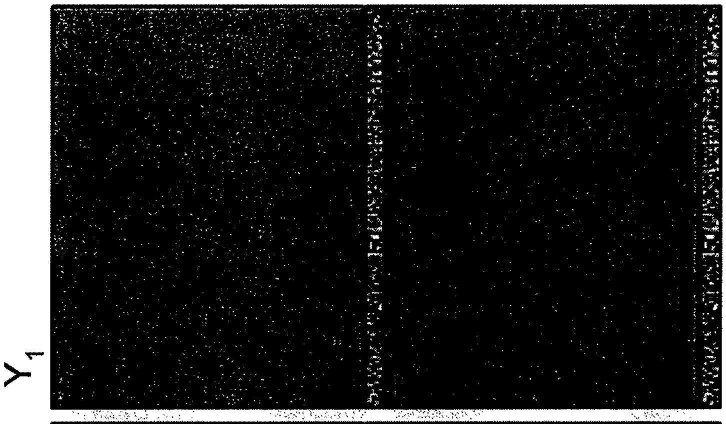
Figure 3D:
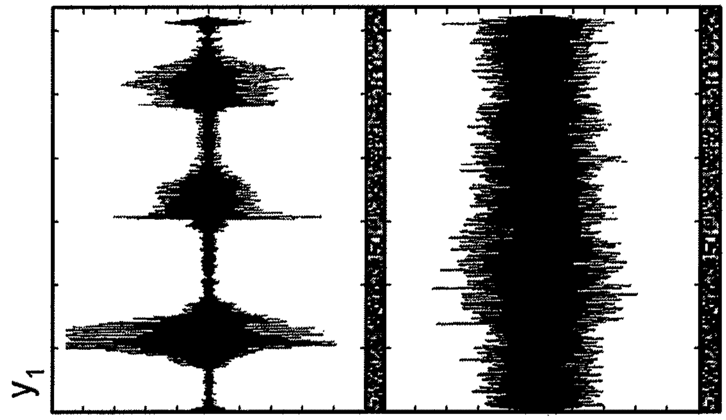
Figure 4:
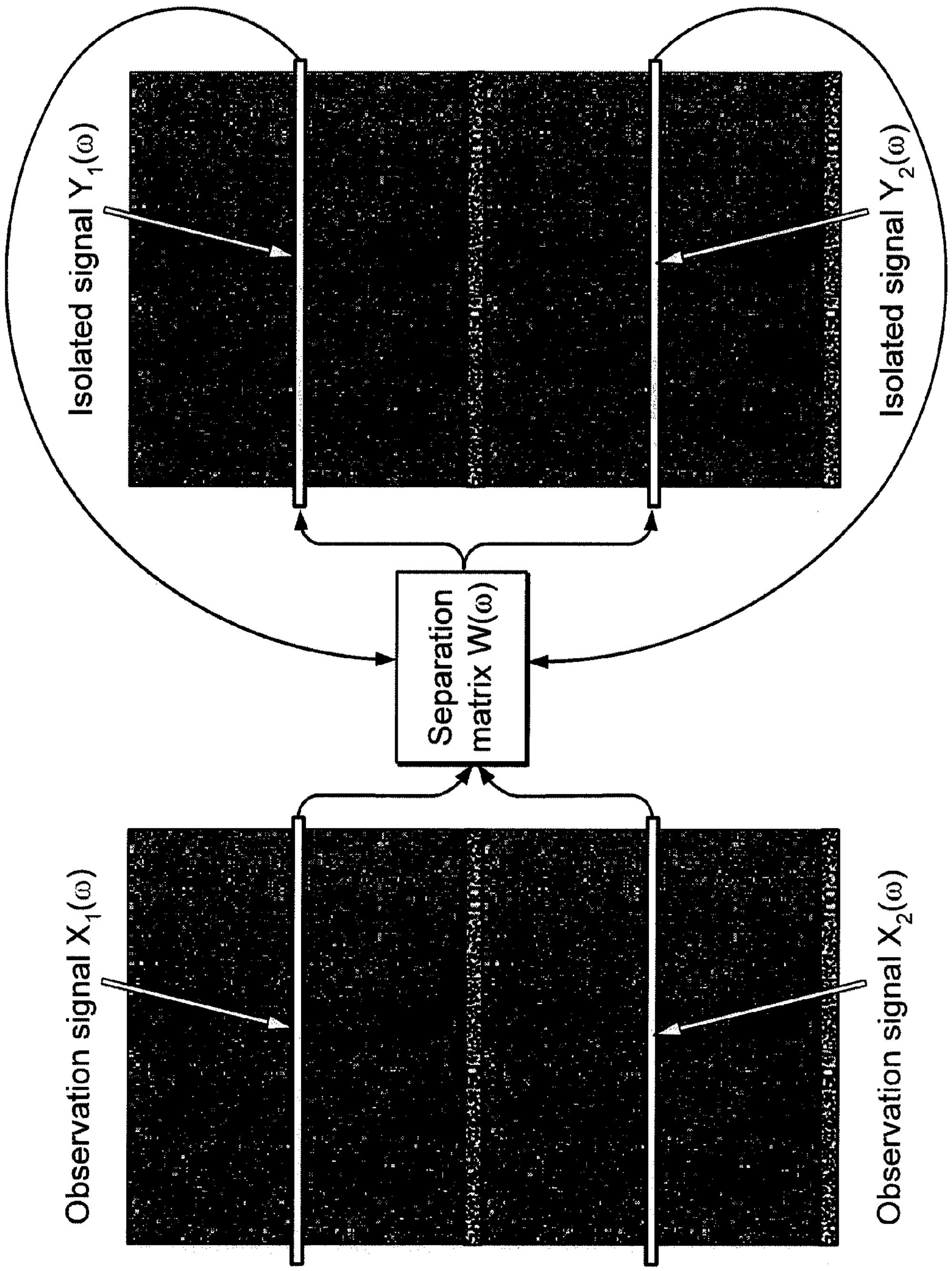
FIG. 4 is a schematic illustration of observation signals and isolated signals obtained by paying attention to a frequency bin.
Figure 5:
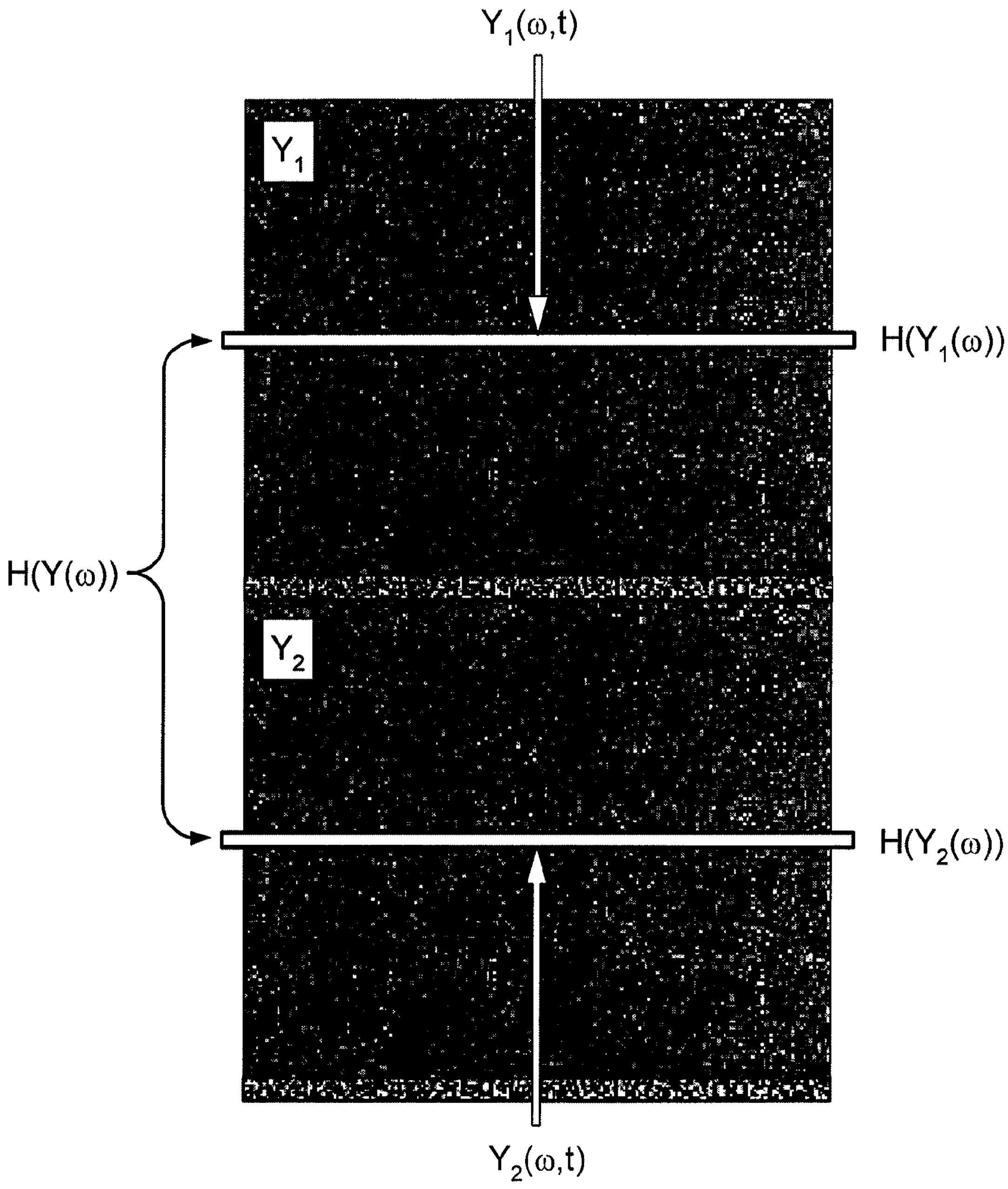
FIG. 5 is a schematic illustration of entropy and simultaneous entropy of the prior art.

Assume a situation as illustrated in FIG. 1 and only audio source k is outputting a sound (original signal k). The signal that is observed at each microphone (observation signal of each audio source) is obtained by convoluting the transfer function relative to the signal of the audio source k down to each microphone. Note that, unlike the case of estimating of an original signal, the observation signal of each audio source is free from indefiniteness of scaling for the reason as described below. When estimating an original signal, it is not possible to discriminate a situation where an originally small original signal gets to a microphone without being attenuated and a situation where an originally large original signal is attenuated on the way before it gets to the microphone. However, it is not necessary to discriminate such two different situations for the observation signal of each audio source.

The process of estimating the observation signal of each audio source from the isolated signals Y' that are estimated original signals proceeds in a manner as described below. Firstly, signals Y' are expressed by using vectors $Y_1(t)$ through $Y_n(t)$ of each channel as shown at the left side of the above-described formula (14). Then, vectors are prepared by replacing all the elements other than $Y_k(t)$ in Y' with 0 vectors. They are expressed by $Y_{Yk}$ (t). $Y_{Yk}(t)$ corresponds to a situation where only the audio source k is sounding in FIG. 1. The observation signal of each audio source is obtained by computing $X_{Yk}(t)=(WP)^{-1}Y_{Yk}(t)$. This computation is repeated for all the channels. Note that $X_{Yk}(t)$ includes the observation signals of all the microphones like the second term of the right side of the above-described formula (14).

In the subsequent processing operations, $X_{Yk}(t)$ may be used or only the observation signal of a specific microphone (e.g., the first microphone) may be extracted. Alternatively, the signal power of each microphone may be computationally determined and the signal with the largest power may be extracted. All these operations subsequently correspond to the use of a signal observed at the microphone that is located closest to the audio source.

As described above in detail, with the audio signal separation apparatus 1 of this embodiment, it is possible to dissolve the problem of permutation without conducting a post processing operation after the signal separation by computing the entropy of a single spectrogram by means of a multidimensional probability density function instead of computing the entropy of each and every frequency bin by means of a one-dimensional probability density function.

Now, specific results obtained by means of a signal separation process according to the invention will be described below.

Figure 7:
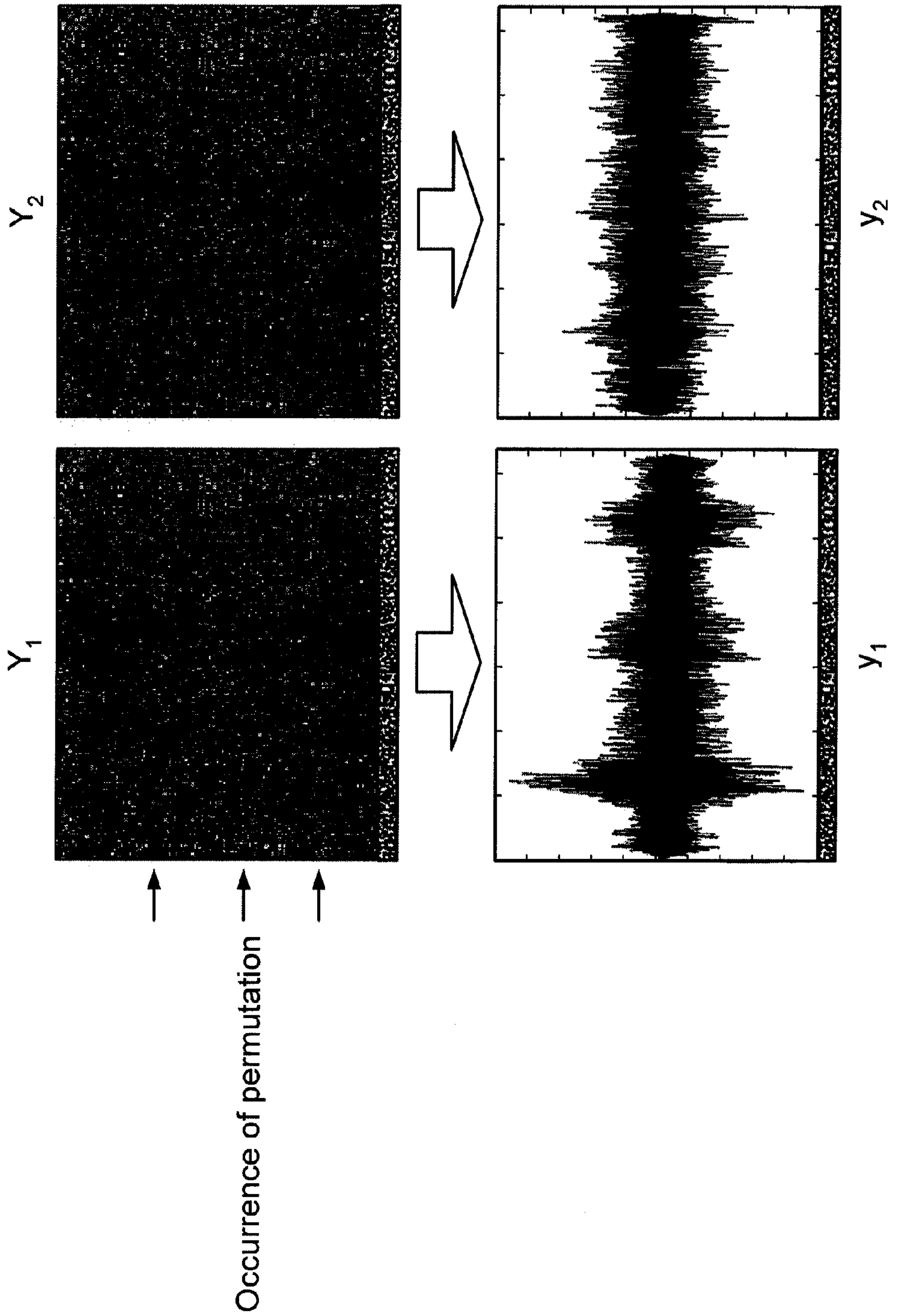
FIG. 7 is a schematic illustration of the outcome of signal separation using a one-dimensional probability density function.
Figure 8:
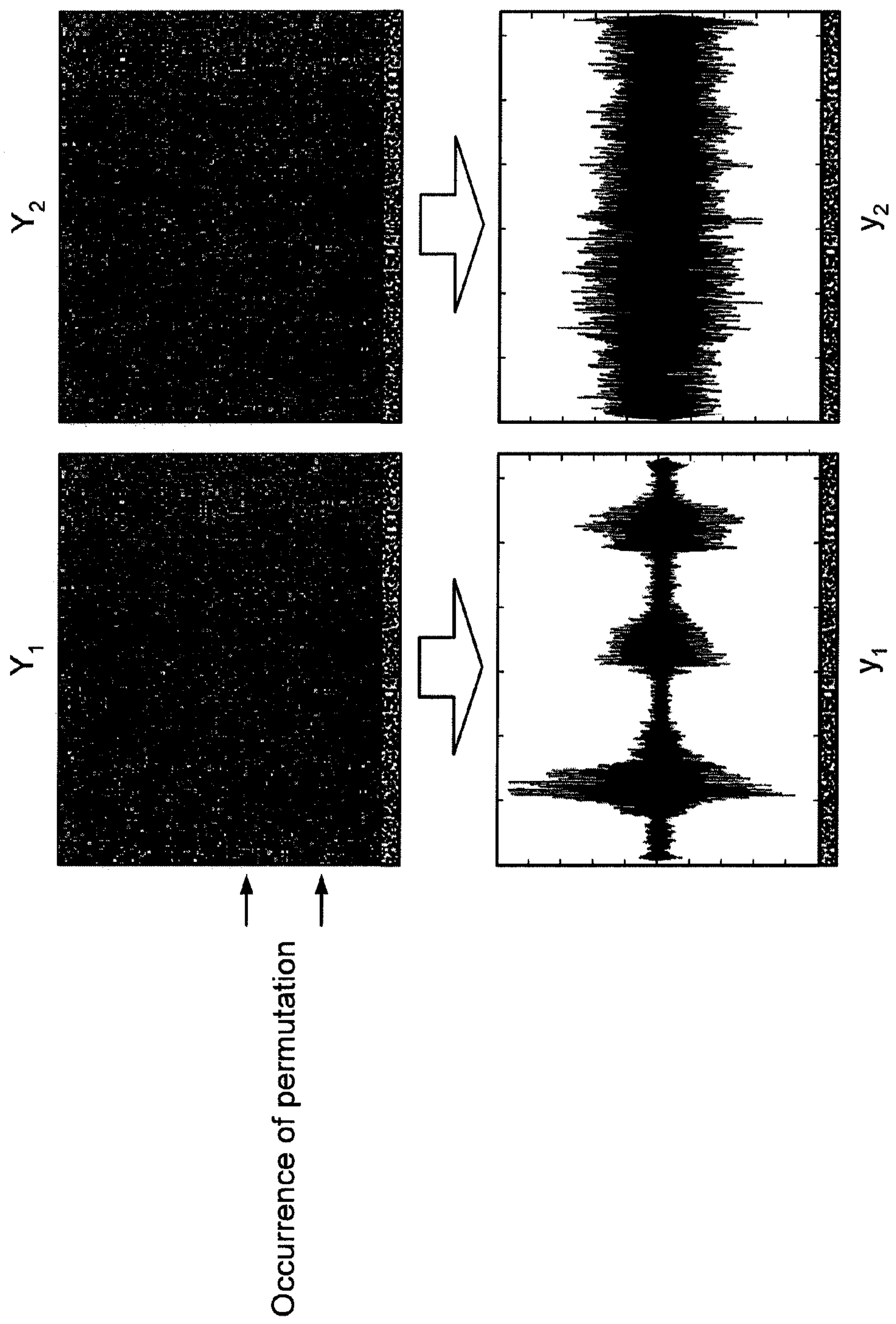
FIG. 8 is a schematic illustration of the outcome of signal separating using frequency coupling and a one-dimensional probability density function.
Figure 18:
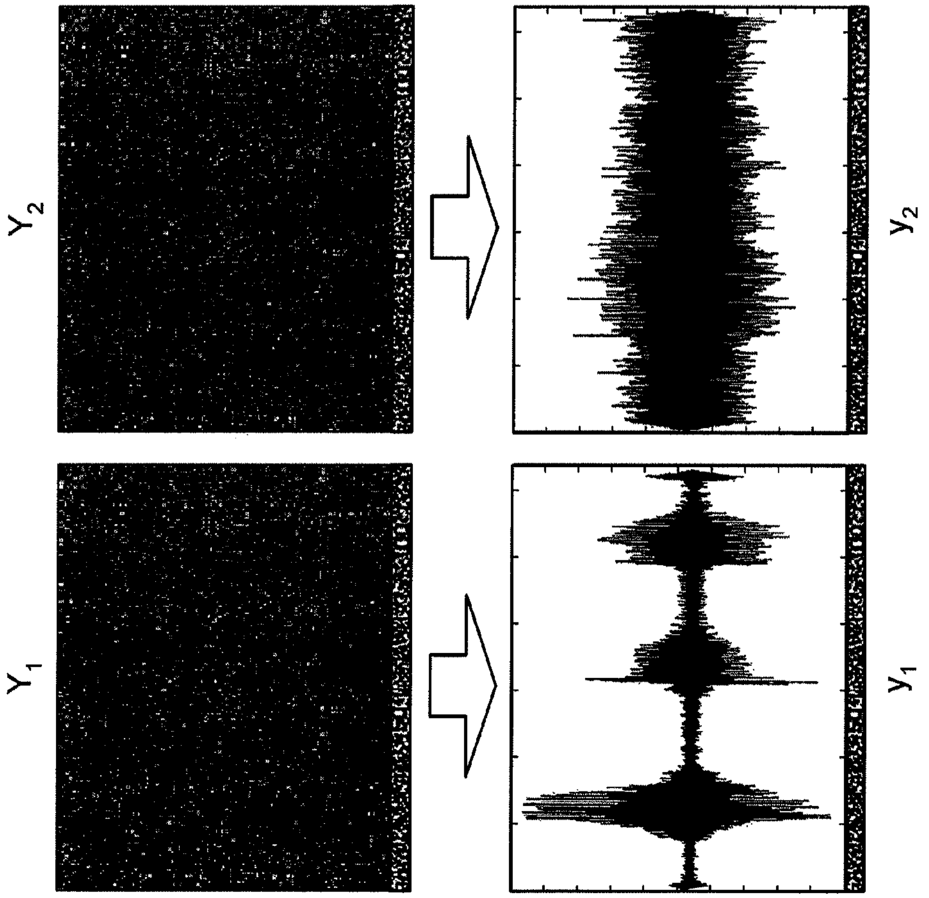
FIG. 18 is a schematic illustration of the outcome of a signal separation process, using a multidimensional probability density function based on a spherical distribution.

FIG. 18 illustrates the results obtained by means of a signal separation process where K=π/2, d=1 and h=1 are used for the formula (42), which is a multidimensional probability density function defined on the basis of spherical distribution. The observation signals are the initial 32,000 samples of the file "X_rms2.wav" and the sampling frequency is 16 kHz. Besides, a Hanning window with a length of 1,024 is used with a shifting width of 128 in the short-time Fourier transformation. Therefore, the number M of frequency bins is 1,024/2+1=513 and the total number of frames T is (32,000−1024)/128+1=243. While permutation appears in the outcome of the separation process using the conventional extended infomax method as shown in FIG. 7, practically no permutation is observable in the outcome of the separation as seen from FIG. 18 although no post-processing operation is involved.

Figure 19A:
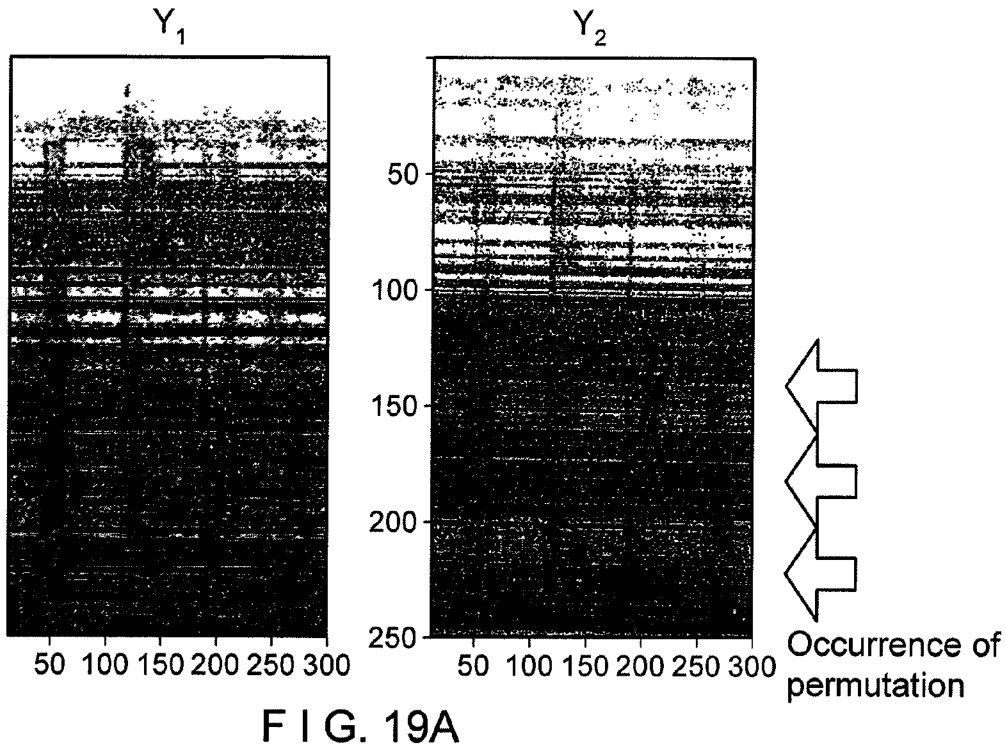
FIGS. 19A and 19B are schematic illustrations of the outcome of a signal separation process, using a score function based on an L norm.
Figure 19B:
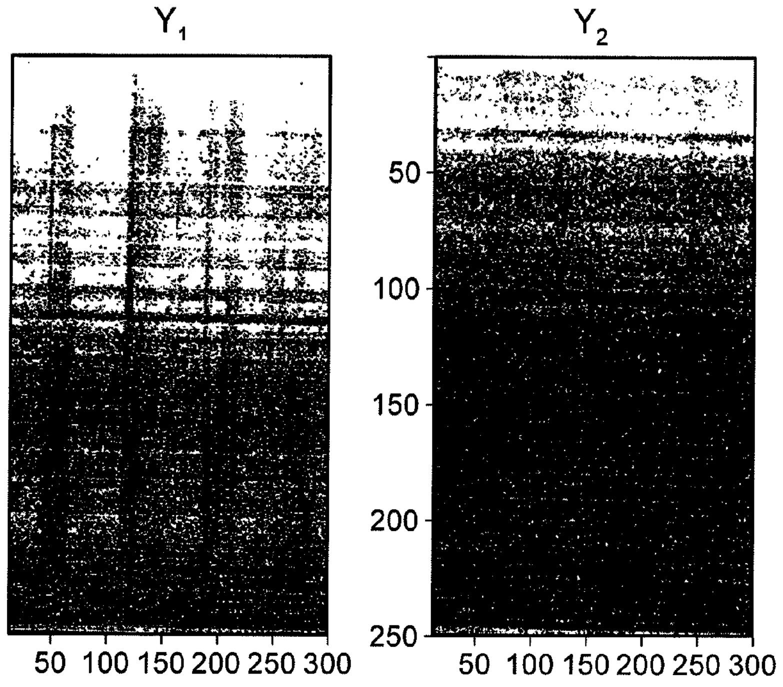

FIG. 19A illustrates the results obtained by means of a signal separation process where N=K=d=m=1 are used for the formula (49), which is a score function based on an $L_N$ norm, while FIG. 19B illustrates the results obtained by means of a signal separation process where N=K=d=m=1 are used for the formula (51). The observation signals are the initial 40,000 samples of the file "X_rms2.wav" and the sampling frequency is 16 kHz. Besides, a Hanning window with a length of 512 is used with a shifting width of 128 in the short-time Fourier transformation. While permutation appears in the outcome of the separation process as indicated by arrows in FIG. 19A when the above formula (49) that does not meet the requirements that the return value represents a dimensionless number and that its phase is inverse to the ω-th phase is used, practically no permutation is observable in the outcome of the separation process as seen from FIG. 19B when the above formula (51) that meets the two requirements is used although no post-processing operation is involved.

Figure 20:
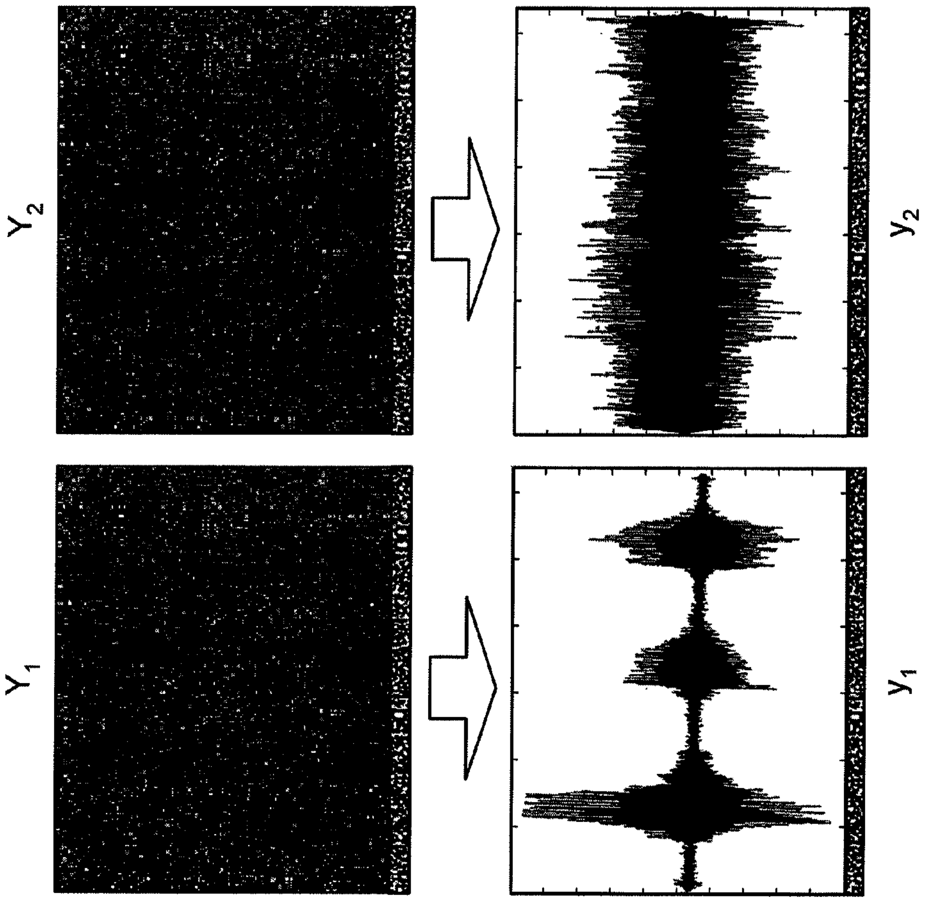
FIG. 20 is a schematic illustration of the outcome of a signal separation process, using a multidimensional probability density function based on a Copula model.
Figure 21A:
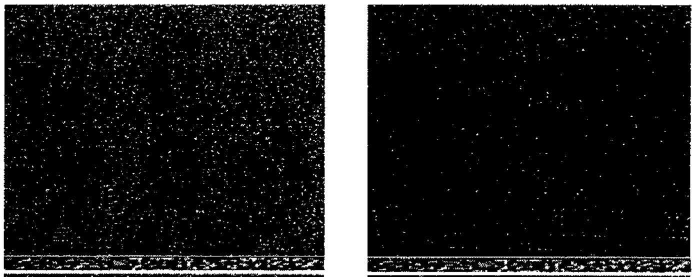
FIGS. 21A through 21E are schematic illustrations of the changes in the spectrogram that are observed when a permutation is artificially generated for obtained separation signals.
Figure 21B:
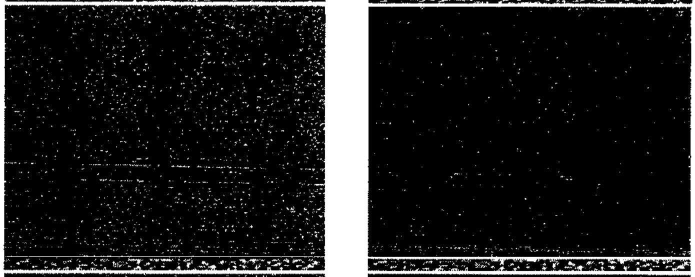
Figure 21C:
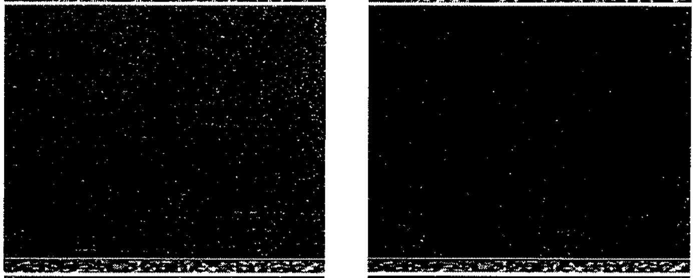
Figure 21D:
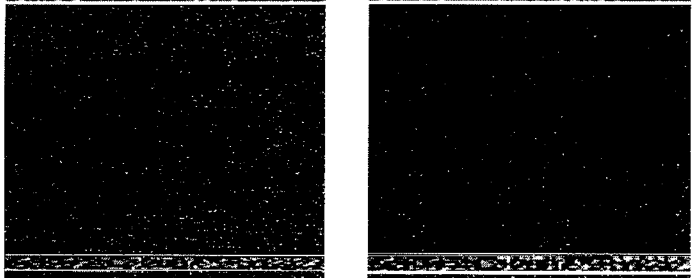
Figure 21E:
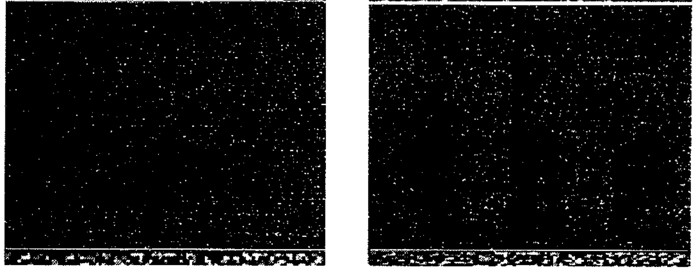

FIG. 20 illustrates the results obtained by means of a signal separation process where K=1 and α=1 are used for the formula (73), which is a multidimensional probability density function based on a copula model. The observation signals, the sampling frequency and other factors are the same as those of FIG. 18. In this case again, practically no permutation is observable in the outcome of the separation process although no post-processing operation is involved.

Now, the results of a verification process where states like those of FIGS. 9 and 10 are produced or not is checked by using the above-described multidimensional probability density function, the observation signals and the outcome of the separation process will be described below. In other words, in this verification process, a state where permutation takes place and a state where no permutation takes place are compared and if the latter state shows a reduced KL information quantity or not is examined.

The verification process proceeds in the following way. Firstly, spectrograms as shown in FIG. 18 are prepared and the KL information quantity of each of the states in FIG. 18 is computationally determined by using the above formula (17). In this experiment, the second and third terms of the formula

(17) can be regarded as so many constants and hence are not influenced by the presence or absence of permutation so that they may be reduced to nil in the experiment. Then, a frequency bin is arbitrarily selected and the data of the frequency bin are exchanged among the channels. In other words, permutation is artificially produced. After the exchange of data, the KL information quantity is computationally determined by using the above formula (17). As this operation is repeated for a number of times equal to the total number of frequency bins without duplication of same computations, all the signals are ultimately switched among the channels. FIGS. 21A through 21E illustrate the process in five different steps. FIGS. 21A through 21E show states where the data of the frequency bins are switched by 0%, 25%, 50%, 75% and 100% respectively.

Figure 22:
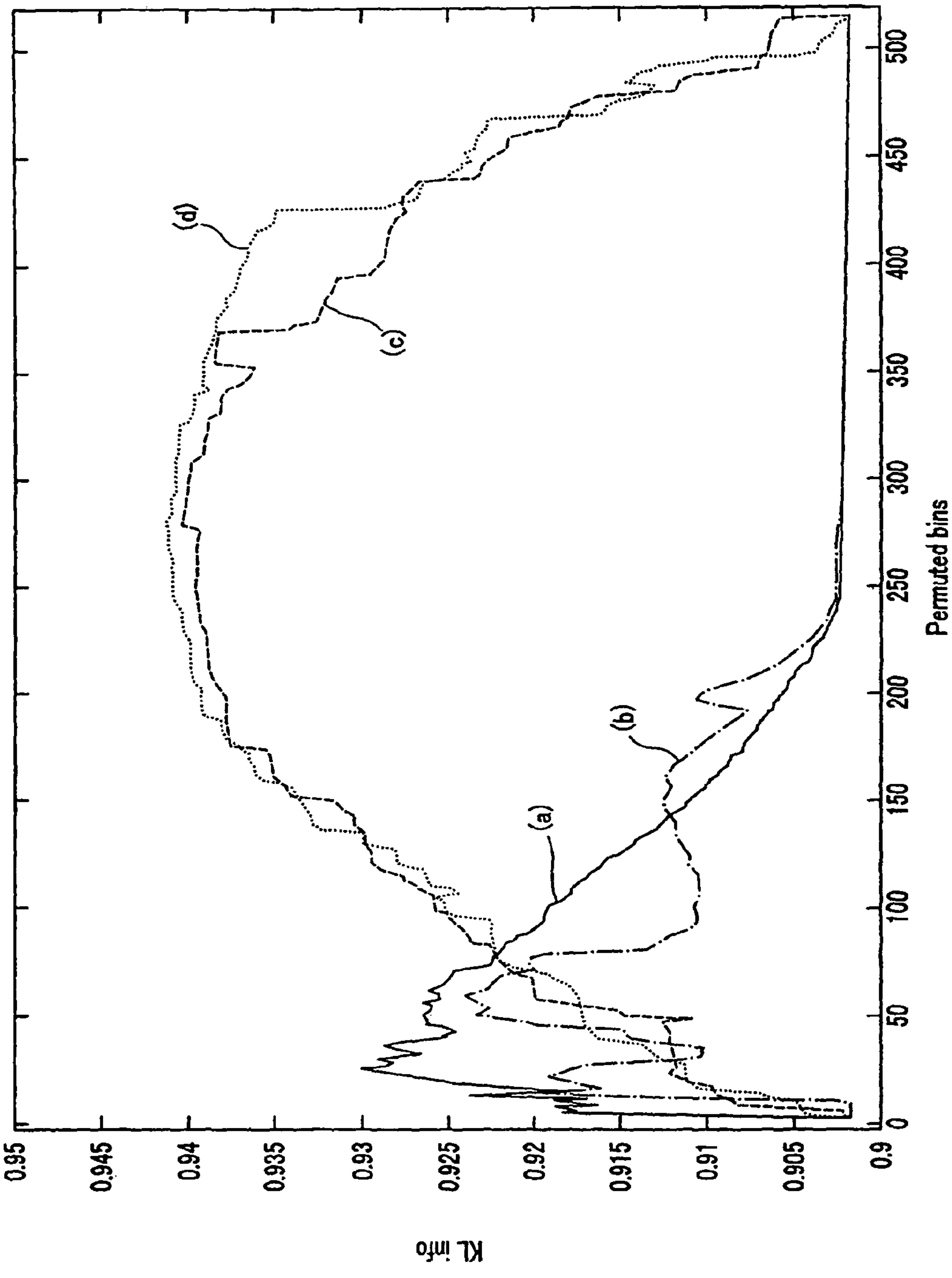
FIG. 22 is a graph illustrating the changes in the KL information quantity that are observed when a permutation is artificially generated for obtained separation signals.

A graph as shown in FIG. 22 is obtained by plotting the KL information quantity for each number of times of operation (which is the number of switched frequency bins) after the processing operation. In FIG. 22, the vertical axis indicates the KL information quantity and the horizontal axis indicates the number of times of operation. Note, however, since the order in which the frequency bins are selected can be arbitrarily determined, four orders including (a) the descending order of the size of the signal components, (b) the sequential order from ω=1 and (c) and (d) random order are used in the experiment. The descending order of the size of the signal components of (a) refers to the order of the magnitude of the value of D(ω) that is computed for each frequency bin (each ω) by means of formula (85) shown below. Also note that FIG. 21 is obtained by following this order.

[FORMULA 42]

$$D(\omega) = \sum_{k=1}^{n} \sum_{t=1}^{T} |Y_k(\omega, t)|^2 \tag{85}$$

All the four plots in the graph of FIG. 22 show the smallest values at the opposite ends thereof. Thus, the actual data of the graph evidence that the KL information quantity that is produced when no permutation takes place (at the opposite ends) is made smaller than any KL information quantity that is produced when permutation takes place by separating signals by means of a multidimensional probability density function as in this embodiment.

In other words, when the relationship between the extent of permutation and the KL information quantity that is computationally determined by means of a multidimensional probability density function is plotted and the KL information quantity shows the smallest values at the opposite ends (and hence when no permutation occurs), it is possible to separate observation signals without causing permutation to take place.

The present invention is by no means limited to the above-described embodiment, which may be modified in various different ways without departing from the spirit and scope of the invention.

For example, a frequency bin where practically no signal exists (and hence only components that are close to nil exist) throughout all the channels does not practically influence signal separation in the time domain regardless if the separation succeeds or not. Therefore, such frequency bins can be omitted to reduce the magnitude of data of the spectrogram and hence the computational complexity and raise the speed of progress of the separation process.

With an example of technique that can be used to reduce the magnitude of data of a spectrogram, after preparing the spectrogram of observation signals, the absolute value of each signal of each frequency bin may be determined to be greater than a predetermined threshold value or not and a frequency bin, if any, where the absolute values of the signals are smaller than the threshold value for all the frames and all the channels is judged to be free from any signal and eliminated from the spectrogram. However, each and every frequency bin that is eliminated needs to be recorded in terms of the order of arrangement so that it may be restored whenever necessary. Thus, if there are m frequency bins that are free from any signal, the spectrogram that are produced after eliminating the frequency bins has M-m frequency bins.

With another example of technique that can be used to reduce the magnitude of data of a spectrogram, the intensity of signal is computationally determined for each frequency bin typically by means of the above formula (59) and the M-m strongest frequency bins are adopted (and the m weaker frequency bins are eliminated).

After reducing the magnitude of data of a spectrogram is reduced, the resultant spectrogram is subjected to a normalization process, a separation process and a resealing process. Then, the eliminated frequency bins are put back. Vectors having components that are all equal to 0 may be used instead of putting back the eliminated signals. Then, isolated signals can be obtained in the time domain by subjecting the signals to inverse Fourier transformation.

While the number of microphones and that of audio sources are equal to each other in the above description of the embodiment, the present invention is applicable to situations where the number of microphones is greater than that of audio sources. In such a case, the number of microphones can be reduced to the number of audio sources typically by using the technique of, for example, principal component analysis (PCA).

While the natural gradient method is used for the algorithm for determining the modified value of ΔW(ω) of the separation matrix in the above description of the embodiment, ΔW(ω) may alternatively be determined by means of a non-holonomic algorithm for the purpose of the present invention. The formula for computing ΔW(ω) can be expressed as ΔW(ω)=B·W(ω), where B is an appropriate square matrix. If a formula that constantly makes the diagonal components of B equal to 0 is used, an updating formula using that formula is referred to as non-holonomic algorithm. See, inter alia, Iwanami-Shoten, "The Frontier of Statistical Science 5: Development of Multivariate Analysis" for non-holonomy.

Formula (86) below is an updating formula for ΔW(ω) that is based on an non-holonomic algorithm. It is possible to prevent any overflow from taking place during the operation of computing W because W is made to vary only in an orthogonal direction.

[Formula 43]

$$\Delta W(\omega)=\{E_1[\varphi_\omega(Y(t))Y(\omega,t)^H-\mathrm{diag}(\varphi_\omega(Y(t))Y(\omega,t)^H)]\}W(\omega) \tag{86}$$

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal separation apparatus for separating observation signals in the time domain of a mixture of a plurality of signals including audio signals by independent component analysis to produce isolated signals in a time-frequency domain, the apparatus comprising:

a first conversion means for converting the observation signals in the time domain into observation signals in the time-frequency domain;

a separation means for producing isolated signals in the time-frequency domain from the observation signals in the time-frequency domain; and a second conversion means for converting the isolated signals in the time-frequency domain into isolated signals in the time domain;

the separation means being adapted to:

produce isolated signals in the time-frequency domain from the observation signals in the time-frequency domain and a separation matrix substituted by initial values, compute the modified value of the separation matrix by using the isolated signals in the time-frequency domain, a score function using a multidimensional probability density function which takes a plurality of frequency components as its arguments and returning a dimensionless number as its return value, and the separation matrix, and modify the separation matrix as a function of the multi-dimensional probability density function until the separation matrix substantially converges by using the modified value and produce isolated signals in the time-frequency domain by using the substantially converging separation matrix.

2. The apparatus according to claim 1, wherein the isolated signals in the time-frequency domain are complex signals; and the score function is adapted to compute the phase component of its return value from a single frequency component included in its arguments and the absolute value from one or more frequency components included in its arguments.

3. An audio signal separation method of separating observation signals in a time domain of a mixture of a plurality of signals including audio signals by independent component analysis to produce isolated signals in a time-frequency domain, the method comprising:

a step of converting, using a first conversion means, the observation signals in the time domain into observation signals in the time-frequency domain;

a step of producing, using a separation means, isolated signals in the time-frequency domain from the observation signals in the time-frequency domain and a separation matrix substituted by initial values;

a step of computing a modified value of the separation matrix by using the isolated signals in the time-frequency domain, a score function using a multidimensional probability density function which takes a plurality of frequency components as its arguments and returning a dimensionless number as its return value, and the separation matrix;

a step of modifying the separation matrix until the separation matrix substantially converges by using the modified value; and a step of converting the isolated signals in the time-frequency domain produced by using the substantially converging separation matrix into isolated signals in a time domain.

4. The method according to claim 3, wherein the isolated signals in the time-frequency domain are complex signals, and the score function is adapted to compute the phase component of its return value from a single frequency component included in its arguments and the absolute value of its return value from one or more frequency components included in its arguments.

5. A non-transitory computer readable medium storing a program for separating observation signals in a time domain of a mixture of a plurality of signals including audio signals by independent component analysis to produce isolated signals in a time-frequency domain, the program comprising the steps of:

a first conversion step that converts the observation signals in the time domain into observation signals in the time-frequency domain;

a separation step that produces isolated signals in the time-frequency domain from the observation signals in the time-frequency domain; and a second conversion step that converts the isolated signals in the time-frequency domain into isolated signals in the time domain, the separation step being adapted to produce isolated signals in the time-frequency domain from the observation signals in the time-frequency domain and a separation matrix substituted by initial values, compute the modified value of the separation matrix by using the isolated signals in the time-frequency domain, a score function using a multidimensional probability density function which takes a plurality of frequency components as its arguments and returning a dimensionless number as its return value, and the separation matrix, modify the separation matrix until the separation matrix substantially converges by using the modified value and produce isolated signals in the time-frequency domain by using the substantially converging separation matrix.

* * * * *